United States Patent
Han et al.

(10) Patent No.: US 9,214,997 B2
(45) Date of Patent: *Dec. 15, 2015

(54) OPERATION OF TERMINAL FOR MULTI-ANTENNA TRANSMISSION

(71) Applicant: LG ELECTRONICS INC., Seoul (KR)

(72) Inventors: Seung Hee Han, Anyang-si (KR); Jae Hoon Chung, Anyang-si (KR); Hyun Soo Ko, Anyang-si (KR); Moon Il Lee, Anyang-si (KR); Yeong Hyeon Kwon, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/555,362

(22) Filed: Nov. 26, 2014

(65) Prior Publication Data

US 2015/0078324 A1   Mar. 19, 2015

Related U.S. Application Data

(63) Continuation of application No. 14/258,800, filed on Apr. 22, 2014, now Pat. No. 8,964,686, which is a continuation of application No. 13/148,936, filed as application No. PCT/KR2010/000823 on Feb. 10, 2010, now Pat. No. 8,767,646.

(60) Provisional application No. 61/151,515, filed on Feb. 11, 2009.

(30) Foreign Application Priority Data

Aug. 20, 2009   (KR) .................. 10-2009-0077225

(51) Int. Cl.
*H04W 4/00* (2009.01)
*H04B 7/06* (2006.01)
(Continued)

(52) U.S. Cl.
CPC ............ *H04B 7/0686* (2013.01); *H04B 7/0689* (2013.01); *H04L 5/003* (2013.01); *H04L 27/2613* (2013.01); *H04L 27/2626* (2013.01)

(58) Field of Classification Search
CPC .................................................. H04L 27/2613
USPC .......................................................... 370/329
See application file for complete search history.

(56) References Cited

U.S. PATENT DOCUMENTS 6,141,393 A   10/2000   Thomas et al.
6,566,948 B1   5/2003   Braithwaite
(Continued)

FOREIGN PATENT DOCUMENTS

CN   1702995   11/2005
CN   1770658   5/2006
(Continued)

OTHER PUBLICATIONS

Papasakellariou, et al., "Sequence Hopping in SC-FDMA Communication Systems," Aug. 2007, 13 pages.
(Continued)

*Primary Examiner* — Wei Zhao
(74) *Attorney, Agent, or Firm* — Lee, Hong, Degerman, Kang & Waimey

(57) ABSTRACT

Embodiments of the present invention relate to a method and an apparatus for enabling a terminal to transmit a signal in a wireless communication system. According to one embodiment, a signal transmission method includes: receiving configuration information for multi-antenna transmission from a base station; configuring a multi-antenna transmission mode in accordance with the received configuration information; and transmitting an uplink channel having a plurality of symbols to the base station through multiple antennas.

20 Claims, 21 Drawing Sheets

(51) Int. Cl.
*H04L 5/00* (2006.01)
*H04L 27/26* (2006.01)

(56) References Cited

U.S. PATENT DOCUMENTS

| | | |
|---|---|---|
| 7,177,351 B2 | 2/2007 | Kadous |
| 7,620,096 B2 | 11/2009 | Bar-Ness et al. |
| 7,724,836 B2 | 5/2010 | Hartmann et al. |
| 7,876,739 B2 | 1/2011 | Ahn et al. |
| 7,974,593 B2 | 7/2011 | Cole et al. |
| 7,995,615 B2 | 8/2011 | Yang et al. |
| 8,116,277 B2 | 2/2012 | Lee et al. |
| 8,238,320 B2 | 8/2012 | Kim et al. |
| 8,249,608 B2 | 8/2012 | Heo et al. |
| 8,331,305 B2 | 12/2012 | Wennstrom et al. |
| 8,385,467 B2 | 2/2013 | Han et al. |
| 8,537,763 B2 | 9/2013 | Wang et al. |
| 8,767,646 B2 | 7/2014 | Han et al. |
| 8,964,686 B2 * | 2/2015 | Han et al. .................. 370/329 |
| 2003/0235147 A1 | 12/2003 | Walton et al. |
| 2004/0120411 A1 | 6/2004 | Walton et al. |
| 2005/0047387 A1 | 3/2005 | Frederiksen et al. |
| 2005/0175112 A1 | 8/2005 | Pisoni et al. |
| 2005/0190728 A1 | 9/2005 | Han et al. |
| 2006/0039496 A1 | 2/2006 | Chae et al. |
| 2006/0039497 A1 | 2/2006 | Vu et al. |
| 2006/0093066 A1 | 5/2006 | Jeong et al. |
| 2006/0133530 A1 | 6/2006 | Kwak et al. |
| 2006/0209754 A1 | 9/2006 | Ji et al. |
| 2007/0014272 A1 | 1/2007 | Palanki et al. |
| 2007/0036179 A1 | 2/2007 | Palanki et al. |
| 2007/0171849 A1 | 7/2007 | Zhang et al. |
| 2007/0183386 A1 | 8/2007 | Muharemovic et al. |
| 2007/0189404 A1 | 8/2007 | Baum et al. |
| 2008/0049692 A1 | 2/2008 | Bachu et al. |
| 2008/0095252 A1 | 4/2008 | Kim et al. |
| 2008/0117833 A1 | 5/2008 | Borran et al. |
| 2008/0153425 A1 | 6/2008 | Heo et al. |
| 2008/0165893 A1 | 7/2008 | Malladi et al. |
| 2008/0186916 A1 | 8/2008 | Oshiba et al. |
| 2008/0186918 A1 | 8/2008 | Tinnakornsrisuphap et al. |
| 2008/0198902 A1 | 8/2008 | Malladi |
| 2008/0205348 A1 * | 8/2008 | Malladi .................. 370/335 |
| 2008/0212506 A1 | 9/2008 | Lee et al. |
| 2008/0212514 A1 | 9/2008 | Chen |
| 2008/0212555 A1 | 9/2008 | Kim et al. |
| 2008/0225791 A1 | 9/2008 | Pi et al. |
| 2008/0227481 A1 | 9/2008 | Naguib et al. |
| 2008/0232240 A1 | 9/2008 | Baum et al. |
| 2008/0232449 A1 | 9/2008 | Khan et al. |
| 2008/0233966 A1 | 9/2008 | Scheim et al. |
| 2008/0253484 A1 | 10/2008 | Kakura et al. |
| 2008/0273513 A1 | 11/2008 | Montojo et al. |
| 2008/0273516 A1 | 11/2008 | Kim et al. |
| 2008/0318608 A1 | 12/2008 | Inoue et al. |
| 2009/0010240 A1 * | 1/2009 | Papasakellariou et al. ... 370/344 |
| 2009/0028261 A1 | 1/2009 | Zhang et al. |
| 2009/0034468 A1 | 2/2009 | Muharemovic et al. |
| 2009/0046645 A1 | 2/2009 | Bertrand et al. |
| 2009/0046694 A1 | 2/2009 | Matsumoto et al. |
| 2009/0060004 A1 | 3/2009 | Papasakellariou et al. |
| 2009/0073955 A1 | 3/2009 | Malladi |
| 2009/0092073 A1 | 4/2009 | Doppler et al. |
| 2009/0092148 A1 | 4/2009 | Zhang et al. |
| 2009/0186613 A1 | 7/2009 | Ahn et al. |
| 2009/0196240 A1 * | 8/2009 | Frederiksen et al. ......... 370/329 |
| 2009/0196249 A1 | 8/2009 | Kawamura et al. |
| 2009/0239476 A1 | 9/2009 | Womack et al. |
| 2009/0245194 A1 | 10/2009 | Damnjanovic et al. |
| 2009/0245212 A1 | 10/2009 | Sambhwani et al. |
| 2009/0245284 A1 | 10/2009 | Xu et al. |
| 2009/0268833 A1 | 10/2009 | Ariyavisitakul et al. |
| 2009/0276507 A1 | 11/2009 | Ahn et al. |
| 2009/0276675 A1 | 11/2009 | Ojala et al. |
| 2009/0280819 A1 | 11/2009 | Brisebois et al. |
| 2009/0285160 A1 | 11/2009 | Cheng et al. |
| 2009/0323617 A1 | 12/2009 | Che et al. |
| 2009/0323625 A1 | 12/2009 | Lee et al. |
| 2010/0022208 A1 | 1/2010 | Cole et al. |
| 2010/0040164 A1 | 2/2010 | Castelain et al. |
| 2010/0046584 A1 | 2/2010 | Palanki et al. |
| 2010/0061361 A1 | 3/2010 | Wu |
| 2010/0091672 A1 | 4/2010 | Ishii |
| 2010/0091724 A1 | 4/2010 | Ishii et al. |
| 2010/0098012 A1 | 4/2010 | Bala et al. |
| 2010/0118800 A1 | 5/2010 | Kim et al. |
| 2010/0135360 A1 | 6/2010 | Kwak et al. |
| 2010/0150081 A1 | 6/2010 | Gao et al. |
| 2010/0150114 A1 | 6/2010 | Che |
| 2010/0150259 A1 | 6/2010 | Castelain et al. |
| 2010/0177741 A1 | 7/2010 | Zhang et al. |
| 2010/0177804 A1 | 7/2010 | Kwak et al. |
| 2010/0179862 A1 | 7/2010 | Chassin et al. |
| 2010/0183104 A1 | 7/2010 | Alexander et al. |
| 2010/0195594 A1 | 8/2010 | Seo et al. |
| 2010/0227569 A1 | 9/2010 | Bala et al. |
| 2010/0302993 A1 | 12/2010 | Robertson et al. |
| 2010/0329200 A1 | 12/2010 | Chen et al. |
| 2010/0329220 A1 | 12/2010 | Kim et al. |
| 2011/0009137 A1 | 1/2011 | Chung et al. |
| 2011/0064164 A1 | 3/2011 | Seo et al. |
| 2011/0090997 A1 | 4/2011 | Han et al. |
| 2011/0103367 A1 | 5/2011 | Ishii |
| 2011/0134861 A1 | 6/2011 | Seo et al. |
| 2011/0158200 A1 | 6/2011 | Bachu et al. |
| 2011/0176624 A1 | 7/2011 | Annavajjala et al. |
| 2011/0194524 A1 | 8/2011 | Hedlund et al. |
| 2011/0199997 A1 | 8/2011 | Wennstrom et al. |
| 2011/0205928 A1 | 8/2011 | Pelletier et al. |
| 2011/0205996 A1 | 8/2011 | Kim et al. |
| 2011/0211522 A1 | 9/2011 | Chung et al. |
| 2011/0261729 A1 | 10/2011 | Ahn et al. |
| 2011/0261895 A1 | 10/2011 | Zhang et al. |
| 2011/0268053 A1 | 11/2011 | Che et al. |
| 2011/0274079 A1 | 11/2011 | Lee et al. |
| 2011/0280203 A1 | 11/2011 | Han et al. |
| 2011/0292900 A1 | 12/2011 | Ahn et al. |
| 2012/0014465 A1 | 1/2012 | Zhang et al. |
| 2012/0026966 A1 | 2/2012 | Wennstrom et al. |
| 2012/0045024 A1 | 2/2012 | Cui et al. |
| 2012/0082113 A1 | 4/2012 | Lee et al. |
| 2012/0083302 A1 | 4/2012 | Borran et al. |
| 2012/0099546 A1 | 4/2012 | Cho et al. |
| 2012/0140798 A1 | 6/2012 | Kadous et al. |
| 2012/0177012 A1 | 7/2012 | Buckley et al. |
| 2012/0236773 A1 | 9/2012 | Shen et al. |
| 2012/0263250 A1 | 10/2012 | Yap et al. |
| 2013/0016701 A1 | 1/2013 | Malladi et al. |
| 2013/0129013 A1 | 5/2013 | Han et al. |
| 2013/0155891 A1 | 6/2013 | Dinan |
| 2013/0178221 A1 | 7/2013 | Jung et al. |
| 2014/0050190 A1 | 2/2014 | Shimezawa et al. |
| 2014/0241279 A1 | 8/2014 | Han et al. |
| 2015/0163025 A1 | 6/2015 | Han et al. |

FOREIGN PATENT DOCUMENTS

| | | |
|---|---|---|
| CN | 101006658 | 7/2007 |
| CN | 101006659 | 7/2007 |
| CN | 101027867 | 8/2007 |
| JP | 2004-524727 | 8/2004 |
| JP | 2007-536830 | 12/2007 |
| JP | 2009290615 | 12/2009 |
| JP | 2010-532130 | 9/2010 |
| JP | 2010-536226 | 11/2010 |
| JP | 2011530941 | 12/2011 |
| KR | 1020050081552 | 8/2005 |
| KR | 1020050114160 | 12/2005 |
| KR | 1020060032765 | 4/2006 |
| KR | 1020070074431 | 7/2007 |
| KR | 1020070091889 | 9/2007 |
| KR | 1020070119958 | 12/2007 |
| KR | 1020080056621 | 6/2008 |
| KR | 10-2008-0065558 | 7/2008 |

(56) References Cited

FOREIGN PATENT DOCUMENTS

| KR | 1020080064756 | 7/2008 |
|---|---|---|
| KR | 1020080065562 | 7/2008 |
| KR | 1020080073616 | 8/2008 |
| KR | 1020080096088 | 10/2008 |
| KR | 1020080097360 | 11/2008 |
| WO | 03/021795 | 3/2003 |
| WO | 2006/019253 | 2/2006 |
| WO | 2007-084988 | 7/2007 |
| WO | 2007/119415 | 10/2007 |
| WO | 2008/044830 | 4/2008 |
| WO | 2008/085000 | 7/2008 |
| WO | 2008137864 | 11/2008 |

OTHER PUBLICATIONS

United States Patent and Trademark Office U.S. Appl. No. 13/057,427, Final Office Action dated Jun. 12, 2013, 11 pages.
United States Patent and Trademark Office U.S. Appl. No. 13/057,130, Office Action dated Feb. 28, 2014, 26 pages.
United States Patent and Trademark Office U.S. Appl. No. 13/057,130, Office Action dated Jan. 22, 2013, 16 pages
The State Intellectual Property Office of the People's Republic of China Application Serial No. 200980131221.X, Office Action dated Apr. 22, 2013, 7 pages.
United States Patent and Trademark Office U.S. Appl. No. 13/743,176, Office Action dated May 6, 2013, 15 pages.
Nortel, UL MIMO Enhancement for LTE-A, R1-082516, 3GPP TSG-RAN Working Group 1 Meeting #53bis, Jul. 5, 2008.
Mitsubishi Electric, Uplink transmit diversity schemes for LTE Advanced, R1-082522, 3GPP TSG RAN WG1 #53bis, Jul. 4, 2008.
Alcatel, ST/SF Coding and Mapping Schemes of the SC-FDMA in E-UTRA Uplink, R1-063178, 3GPP TSG RAN WG1 Meeting #47, Nov. 10, 2006.
Qualcomm Europe, Further details on UL ACK/NACK resource allocation, R1-081966, 3GPP TSG RAN1 #53, May 9, 2008.
Texas Instruments, et al., On Remaining Issues of PUCCH Slot Based CS/OC Remapping, R1-082660, 3GPP TSG RAN WG1 #53b, Jul. 4, 2008.
Panasonic, et al., Joint Way forward on the ACK/NACK scrambling for PUCCH, R1-082731, 3GPP TSG RAN WG1 Meeting #54, Jul. 4, 2008.
United States Patent and Trademark Office U.S. Appl. No. 13/128,867, Office Action dated Nov. 15, 2013, 10 pages.
United States Patent and Trademark Office U.S. Appl. No. 13/057,427, Notice of Allowance dated Nov. 7, 2013, 6 pages.
United States Patent and Trademark Office U.S. Appl. No. 13/128,867, Office Action dated Jun. 27, 2013, 13 pages.
The State Intellectual Property Office of the People's Republic of China Application Serial No. 200980149691.9, Office Action dated Jun. 28, 2013, 5 pages.
United States Patent and Trademark Office U.S. Appl. No. 13/058,294, Office Action dated Feb. 14, 2013, 11 pages.
Nokia Siemens Networks, et al., "PUCCH Resource Allocation for Repeated ACK/NACK", 3GPP TSG RAN WG1 Meeting #54, R1-083094, Aug. 2008, 3 pages.
United States Patent and Trademark Office U.S. Appl. No. 14/495,472, Notice of Allowance dated Nov. 20, 2014, 4 pages.
United States Patent and Trademark Office U.S. Appl. No. 14/091,071, Office Action dated Mar. 4, 2014, 9 pages.
Noh et al, "Standardization Trend of 3GPP LTE and LTE-Advanced", Telecommunication Trend Analysis vol. 23, No. 3, Jun. 2008.

United States Patent and Trademark Office U.S. Appl. No. 13/129,113, Office Action dated Sep. 13, 2013, 13 pages.
LG Electronics, "Uplink MIMO Transmission for LTE-Advanced", R1-084199, 3GPP TSG RAN WG1 Meeting #55, Nov. 2008, 6 pages.
Nortel, "Performance Evaluation of Multi-Antenna SC-FDMA in LTE-A", R1-084471, 3GPP TSG-RAN WG1#55, Nov. 2008, 3 pages.
Samsung, "Selection of Orthogonal Cover and Cyclic Shift for High Speed UL ACK Channels," 3GPP TSG RAN WG1 Meeting #50, R1-073564, Aug. 2007, 5 pages.
The State Intellectual Property Office of the People's Republic of China Application Serial No. 200980131221.X, Office Action dated Jan. 6, 2014, 7 pages.
NEC Group, "PUCCH Allocation for ACK/NACK Transmission", 3GPP TSG RAN WG1 Meeting #50, R1-073462, Aug. 2007.
Interdigital Communications, LLC "ACK/NACK Index Mapping for Uplink Transmission for E-UTRA", 3GPP TSG RAN WG1 Meeting #51, R1-074701, Nov. 2007.
Motorola, "UL ACK/NACK for TDD", 3GPP TSG RAN1#52, R1-080738, Feb. 2008.
Nokia Siemens Networks, et al., "Implicit Mapping of ACK/NACK Resources", 3GPP TSG RAN WG1 Meeting #52, R1-080939, Feb. 2008.
LG Electronics Inc., "Efficient Utilization of Unused PUCCH RB", 3GPP TSG RAN WG1 #52bis, R1-081258, Apr. 2008.
Motorola, "Uplink ACK/NACK for TDD", 3GPP TSG RAN1#52-Bis, R1-081292, Apr. 2008.
Huawei, "Physical Layer Technologies for LTE-Advanced", 3GPP TSG RAN WG1#53, R1-081838, May 2008.
Nokia Siemens Networks, et al., "ACK/NACK Bundling Details for LTE TDD", 3GPP TSG RAN WG1 Meeting #53, R1-081858, May 2008.
Ericsson, "Carrier Aggregation in LTE-Advanced", TSG-RAN WG1 #53bis, R1-082468, Jun. 2008.
QUALCOMM Europe, "UL ACK/NACK Assignment Procedure", 3GPP TSG-RAN WG1 #54, R1-083176, Aug. 2008.
Nokia Siemens Networks, et al., "PUCCH Resource Allocation for Repeated ACK/NACK", 3GPP TSG RAN WG1 Meeting #54bis, R1-083722, Sep. 2008.
United States Patent and Trademark Office U.S. Appl. No. 13/058,294, Office Action dated Oct. 29, 2013, 11 pages.
United States Patent and Trademark Office U.S. Appl. No. 13/057,427, Office Action dated Dec. 28, 2012, 10 pages.
United States Patent and Trademark Office U.S. Appl. No. 13/054,351, Final Office Action dated Jan. 2, 2013, 14 pages.
United States Patent and Trademark Office U.S. Appl. No. 14/626,744, Notice of Allowance dated Mar. 23, 2015, 4 pages.
LG Electronics, "Uplink ACK/NACK Index Mapping,"3GPP RAN WG1 #48bis, R1-071547, Mar. 2007, 5 pages.
LG Electronics, "Allocation of UL ACK/NACK index," 3GPP TSG RAN WG1 #49, R1-072348, May 2007, 4 pages.
Huawei, "Relation between UL ACK/NACK and DL CCE," 3GPP TSG RAN WG1 #50bis, R1-074063, Oct. 2007, 6 pages.
Editor (Motorola), "36.213 PUCCH timing and other formatting and typo corrections," 3GPP TSG-RAN WG1 Meeting #52bis, R1-081586, Mar. 2008, 29 pages.
Ericsson, "Introducing missing L1 parameters to 36.211," 3GPP TSG-RAN Meeting #53bis, R1-082655, Jun. 2008, 28 pages.
European Patent Office Application Serial No. 09826310.6, Search Report dated Jul. 6, 2015, 11 pages.
United States Patent and Trademark Office U.S. Appl. No. 14/744,738, Notice of Allowance dated Jul. 20, 2015, 4 pages.

* cited by examiner

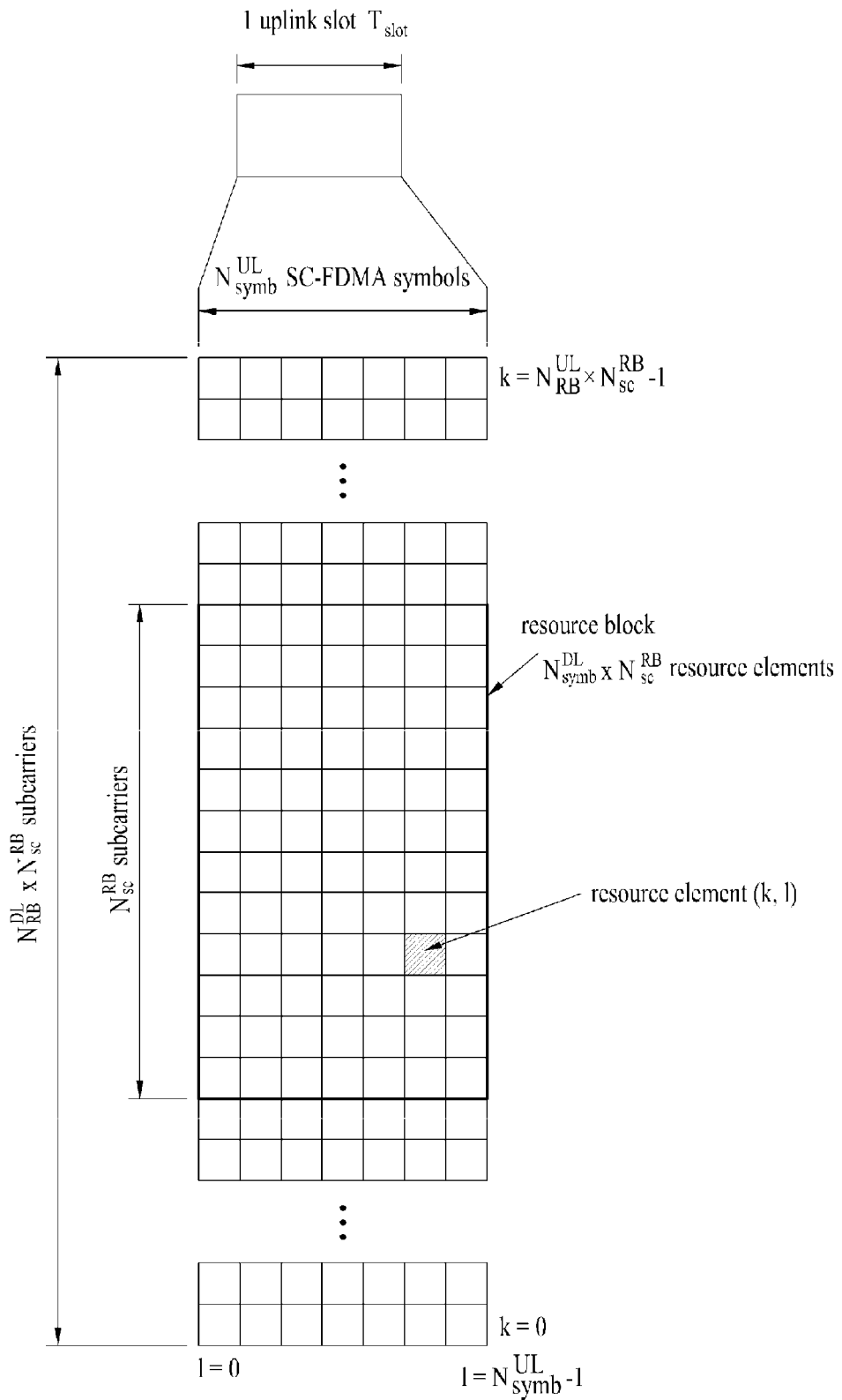

PUCCH format 1a and 1b structure (normal CP case)

PUCCH format 2, 2a, and 2b structure (normal CP case)

FIG 12 resource allocation: 18 ACK/NACK channel in case of normal CP $\triangle_{shift}^{PUCCH} = 2$

| cell-specific cyclic shift offset | | RS orthogonal cover | | | ACK/NACK orthogonal cover | | |
|---|---|---|---|---|---|---|---|
| $\delta_{offset}^{PUCCH}=1$ | $\delta_{offset}^{PUCCH}=0$ | $\overline{n}_{OC}=0$ | $\overline{n}_{OC}=1$ | $\overline{n}_{OC}=2$ | $n_{OC}=0$ | $n_{OC}=1$ | $n_{OC}=2$ |
| $n_{CS}=1$ | $n_{CS}=0$ | n'=0 | | | n'=0 | | |
| 2 | 1 | | 6 | 12 | 1 | 6 | 12 |
| 3 | 2 | | 7 | 13 | | 7 | 13 |
| 4 | 3 | 2 | | 14 | 2 | | 14 |
| 5 | 4 | | 8 | 15 | | 8 | 15 |
| 6 | 5 | 3 | | 16 | 3 | | 16 |
| 7 | 6 | | 9 | 17 | 4 | 9 | 17 |
| 8 | 7 | 4 | | | | 10 | |
| 9 | 8 | | 10 | | | | |
| 10 | 9 | 5 | | | 5 | 11 | |
| 11 | 10 | | 11 | | | | |
| 0 | 11 | | | | | | |

$\triangle_{shift}^{PUCCH} \in \left\{ \begin{array}{l} \{1,2,3\} \text{ In case of normal CP} \\ \{1,2,3\} \text{ In case of extended CP} \end{array} \right.$     $\delta_{shift}^{PUCCH} \in \{0,1,..., \triangle_{shift}^{PUCCH}-1\}$ cell-specific cyclic shift offset $n_{OC}$    orthogonal sequence index for ACK/NACK $\overline{n}_{OC}$    orthogonal sequence index for RS $n_{CS}$    cyclic shift value of CAZAC sequence n'    ACK/NACK resource index used in channelization in RB cell-specific cyclic shift value of CAZAC sequence

| cyclic shift | orthogonal cover | | |
|---|---|---|---|
| | $OC_{index}=0$ | $OC_{index}=1$ | $OC_{index}=2$ |
| 0 | | | |
| 1 | | | |
| 2 | | | |
| 3 | | | |
| 4 | | | |
| 5 | | | |
| 6 | | | |
| 7 | | | |
| 8 | | | |
| 9 | | | |
| 10 | | | |
| 11 | | | |

ACK/NACK (rows 0–3)
CQI (rows 5–10)
guard shift (rows 4, 11)

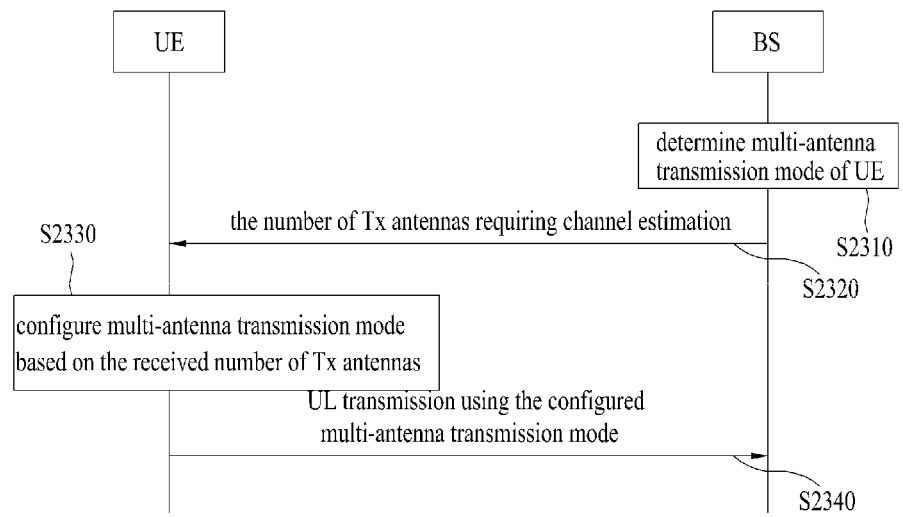
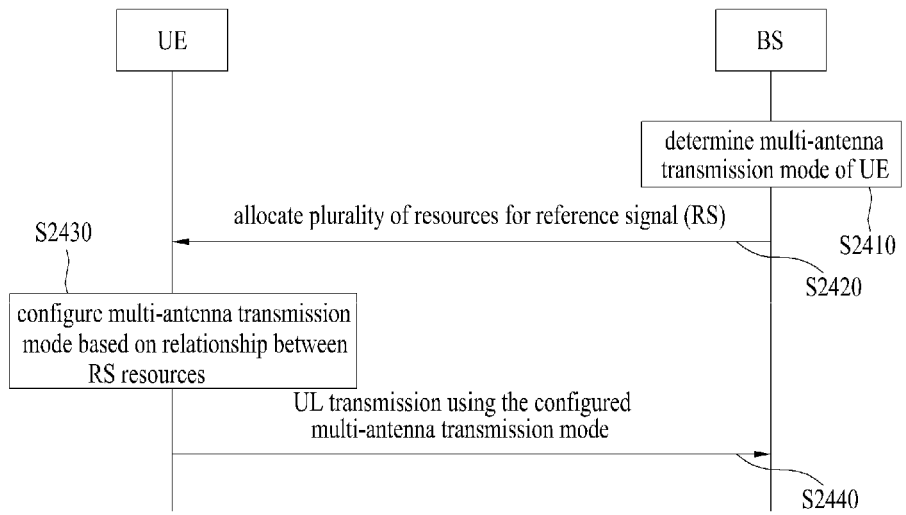

OPERATION OF TERMINAL FOR MULTI-ANTENNA TRANSMISSION

CROSS-REFERENCE TO RELATED APPLICATIONS

This application is a continuation of U.S. application Ser. No. 14/258,800, filed on Apr. 22, 2014, now U.S. Pat. No. 8,964,686, which is a continuation of U.S. application Ser. No. 13/148,936, filed Sep. 27, 2011, now U.S. Pat. No. 8,767, 646, which is the National Stage filing under 35 U.S.C. 371 of International Application No. PCT/KR2010/000823, filed on Feb. 10, 2010, which claims the benefit of earlier filing date and right of priority to Korean Application No. 10-2009-0077225, filed on Aug. 20, 2009, and also claims the benefit of U.S. Provisional Application Ser. No. 61/151,515, filed on Feb. 11, 2009, the contents of all of which are incorporated by reference herein in their entireties.

TECHNICAL FIELD

The present invention relates to a radio communication system. The present invention relates to a radio communication system for supporting at least one of Single Carrier-Frequency Division Multiple Access (SC-FDMA), Multi Carrier-Frequency Division Multiple Access (MC-FDMA) and Orthogonal Frequency Division Multiple Access (OFDMA) and, more particularly, to operation of a User Equipment (UE) for multi-antenna transmission in a radio communication system and an apparatus for the same.

BACKGROUND ART $3^{rd}$ Generation Partnership Project (3GPP) based on Wideband Code Division Multiple Access (WCDMA) radio access technology has been widely developed worldwide. High Speed Downlink Packet Access (HSDPA), which may be defined as the first evolution of WCDMA, provides radio access technology having high competitiveness in the mid-term future to 3GPP. As a system for providing high competitiveness in the mid-term future, there is an Evolved-Universal Mobile Telecommunications System (E-UMTS).

FIG. 1 shows a network architecture of the E-UMTS. The E-UMTS is an evolved form of a WCDMA UMTS, and the standardization thereof is ongoing in the 3GPP. The E-UMTS is also called a Long Term Evolution (LTE) system. For the detailed contents of the technical specifications of the UMTS and the E-UMTS reference may be made to Release 7 and Release 8 of "$3^{rd}$ Generation Partnership Project; Technical Specification Group Radio Access Network", respectively.

As shown in FIG. 1, the E-UMTS may include a User Equipment (UE), a base station (hereinafter, referred to as an "eNode B" or "eNB"), and an Access Gateway (AG) positioned at the end of the network (Universal Terrestrial Radio Access Network: E-UTRAN) and connected to an external network. Generally, the eNode B may simultaneously transmit multiple data streams, for broadcast services, multicast services and/or unicast services. One or more cells may exist in one eNode B. A plurality of eNode Bs may be connected by an interface for transmitting the user traffic or control traffic. A Core Network (CN) may include the AG and a network node for the user registration of the UE. An interface for distinguishing between the E-UTRAN and the CN may be used. The AG manages the mobility of the UE in the unit of Tracking Areas (TAs). The TA is composed of a plurality of cells. When the UE moves from a specific TA to another TA, the UE informs the AG that the TA of the UE is changed.

DISCLOSURE

Technical Problem

Although radio access technology has been developed to LTE based on WCDMA, the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable UE power consumption and the like are required. The standardization of the subsequent technology of the LTE is ongoing in the 3GPP. In the present specification, the above-described technology is called "LTE-Advanced" or "LTE-A".

In the case of LTE, in downlink transmission, Multiple-Input Multiple-Output (MIMO) is applied and spatial multiplexing is used. However, in uplink transmission, due to problems associated with efficiency of a power amplifier of a UE and the arrangement of antennas, spatial multiplexing is not considered. However, in order to maximize the use of frequency resources or a demand for high-speed communication, the LTE-A requires spatial multiplexing using the MIMO in uplink transmission. In detail, the LTE-A requires spatial multiplexing up to a maximum of four layers in uplink transmission. In addition, the LTE-A requires transmission of a maximum of two transmission blocks via one subframe per component carrier in the case of multiplexing by a single user in uplink transmission. The term "component carrier" refers to a basic frequency block used in carrier aggregation. The term "carrier aggregation" refers to technology for logically combining a plurality of frequency blocks and supporting a wideband. The LTE-A uses the frequency aggregation technology for wideband.

An object of the present invention devised to solve the problem lies in a method and apparatus for performing uplink transmission via multiple antennas in a radio communication system.

Another object of the present invention devised to solve the problem lies in a signaling method and apparatus associated with uplink transmission using multiple antennas.

A further object of the present invention devised to solve the problem lies in a method and apparatus for determining a multi-antenna transmission mode when performing uplink transmission.

Technical Solution

In accordance with one aspect of the present invention, the objects of the present invention can be achieved by providing a method for transmitting a signal from a User Equipment (UE) in a radio communication system, the method including receiving configuration information for multi-antenna transmission from a base station, configuring a multi-antenna transmission mode according to the configuration information, and transmitting an uplink channel having a plurality of symbols (for example, OFDMA or SC-FDMA symbols) to the base station through multiple antennas.

In accordance with another aspect of the present invention, the objects of the present invention can be achieved by providing a user equipment including multiple antennas, a radio frequency module configured to receive configuration information for multi-antenna transmission from a base station and to transmit an uplink channel having a plurality of symbols (for example, OFDMA or SC-FDMA symbols) to the base station through the multiple antennas according to a set multi-antenna transmission mode, and a processor configured to set the multi-antenna transmission mode according to the configuration information.

Here, the configuration information may be 1-bit information indicating whether or not a Multiple Input Multiple Output (MIMO) transmission scheme is used.

Here, the configuration information may indicate the total number of antennas that require channel estimation.

Here, the configuration information may include uplink scheduling information.

Here, the uplink channel may be transmitted using an Orthogonal Space Resource Transmission (OSRT) scheme.

In accordance with another aspect of the present invention, the objects of the present invention can be achieved by providing a method for transmitting a signal from a User Equipment (UE) in a radio communication system, the method including checking one or more resources associated with an uplink channel having a plurality of symbols (for example, OFDMA or SC-FDMA symbols), configuring a multi-antenna transmission mode based on the one or more resources, and transmitting the uplink channel to the base station through multiple antennas.

In accordance with another aspect of the present invention, the objects of the present invention can be achieved by providing a user equipment including multiple antennas, a radio frequency module configured to transmit an uplink channel having a plurality of symbols (for example, OFDMA or SC-FDMA symbols) to a base station through the multiple antennas according to a set multi-antenna transmission mode, and a processor configured to check one or more resources associated with the uplink channel and to set the multi-antenna transmission mode based on the one or more resources.

Here, the uplink channel may be a Physical Uplink Control CHannel (PUCCH). In addition, the uplink channel may be a Physical Uplink Shared CHannel (PUSCH) and the one or more resources may be associated with a reference signal.

Here, the one or more resources may include Cyclic Shift (CS), Orthogonal Covering (OC) or a Resource Block (RB), or an arbitrary combination of the CS, OC, and RB.

Here, the multi-antenna transmission mode may be determined based on the total number of the one or more resources.

Here, the multi-antenna transmission mode may be determined based on the number of resources that have a predetermined relationship from among the one or more resources. In this case, the one or more resources may be indicated using a plurality of fields and the multi-antenna transmission mode may be determined based on whether or not the fields are identical to each other. In addition, the one or more resources may be indicated for each antenna and the multi-antenna transmission mode may be determined based on whether or not the resources are identical to each other.

Advantageous Effects

The embodiments of the present invention have the following effects.

First, it is possible to provide a method and apparatus for performing uplink transmission via multiple antennas in a radio communication system.

Second, it is possible to provide a signaling method and apparatus associated with uplink transmission using multiple antennas.

Third, it is possible to provide a method and apparatus for determining a multi-antenna transmission mode when performing uplink transmission.

Advantages of the present invention are not limited to those described above and other advantages will be clearly understood by those skilled in the art from the following description.

DESCRIPTION OF DRAWINGS

The accompanying drawings, which are included to provide a further understanding of the invention, illustrate embodiments of the invention and together with the description serve to explain the principle of the invention.

In the drawings:

FIG. 7 is a view showing a resource grid of a slot;

FIG. 12 illustrates ACK/NACK channelization for a PUCCH format 1a/1b;

FIGS. 19 to 24 illustrate procedures for performing uplink transmission through multiple antennas according to an embodiment of the present invention.

MODE FOR INVENTION

The configuration, operation and other features of the present invention will be understood by the preferred embodiments of the present invention described with reference to the accompanying drawings. The following embodiments are examples of applying the technical features of the present invention to the $3^{rd}$ Generation Partnership Project (3GPP). However, these embodiments are only exemplary and the present invention may be used in any communication system having multiple antennas without limit. Unless specifically stated otherwise, the term "antenna" refers to both a physical antenna and a logical antenna.

An Orthogonal Frequency Division Multiplexing Access (OFDMA) scheme uses an OFDM scheme. The OFDM scheme divides a data stream with a high transfer rate into a plurality of data streams with low transfer rate and simultaneously transmits the plurality of data streams using a plurality of orthogonal subcarriers. The OFDMA scheme provides some of available subcarriers to users so as to realize multiplexing access. The OFDMA scheme has preferable characteristics such as high spectrum efficiency and robustness to multi-path influences. However, the OFDMA scheme has a disadvantage such as high Peak-to-Average Power Ratio (PAPR). A high PAPR occurs due to in-phase addition of subcarriers. As the number of subcarriers via which one user transmits a signal is increased, the PAPR is increased. The PAPR converges into about 8 dB at a 95% confidence level. In a radio communication system, a high PAPR is not preferable and may deteriorate system performance. In detail, in an OFDMA symbol, peak power may be operated in a nonlinear region or may be clipped to a predetermined value, in a power amplification process. Accordingly, high peak power may cause signal quality deterioration and signal distortion and thereby may have an influence on channel estimation and data detection. The SC-FDMA scheme is technology suggested for reducing a high PAPR observed in the OFDMA scheme. The SC-FDMA scheme is different from the OFDMA scheme in that data is spread in a frequency domain via Discrete Fourier Transform (DFT) precoding prior to an Inverse Fast Fourier Transform (IFFT) process. If the SC-FDMA scheme is used, the PAPR of a transmitted signal can be further decreased, compared with the case of using the OFDMA scheme. In the present specification, the SC-FDMA scheme is also called a DFT-Spread-OFDMA (DFT-s-OFDMA) scheme.

Figure 1:
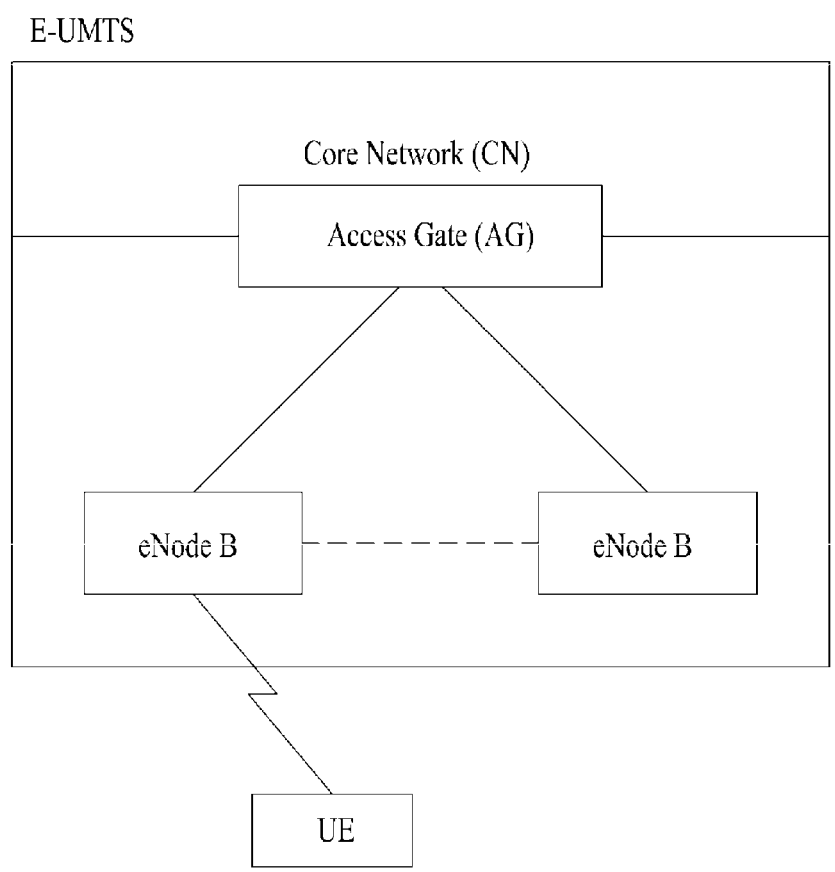
FIG. 1 is a view showing a network architecture of an E-UMTS.
Figure 2:
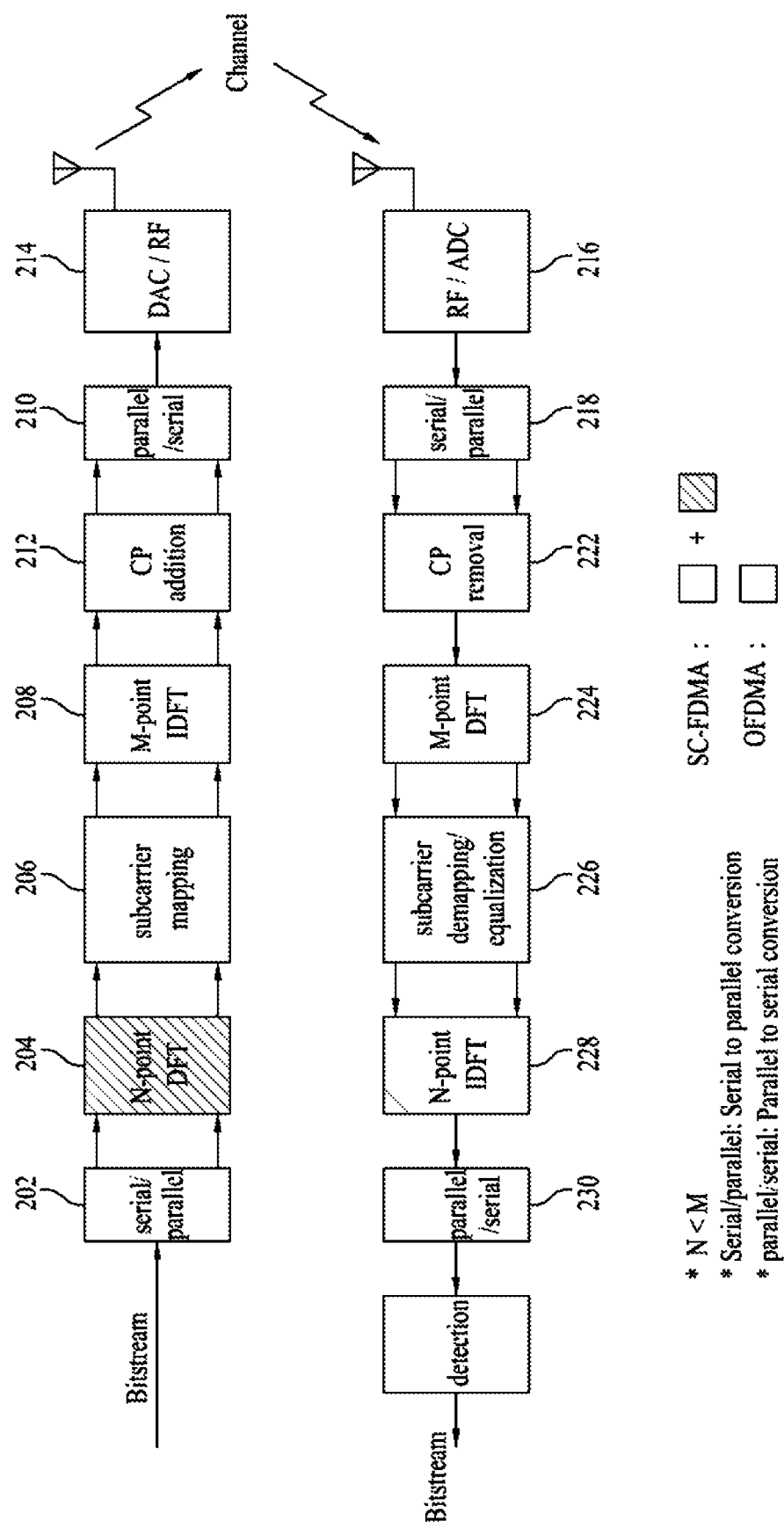
FIG. 2 is a block diagram of a transmitter and a receiver for OFDMA and SC-FDMA.

FIG. 2 is a block diagram of a transmitter and a receiver for OFDMA and SC-FDMA. In uplink, the transmitter may be a portion of a User Equipment (UE) and the receiver may be a portion of a base station (eNode B). In downlink, the transmitter may be a portion of an eNode B and the receiver may be a portion of a UE.

As shown in FIG. 2, an OFDMA transmitter includes a serial-to-parallel converter 202, a subcarrier mapping module 206, an M-point IDFT module 208, a Cyclic Prefix (CP) adding module 210, a parallel-to-serial converter 212, and a Radio Frequency (RF)/Digital-to-Analog Converter (DAC) module 214.

A signal processing procedure of the OFDMA transmitter is as follows. First, a bit stream is modulated to a data symbol sequence. The bit stream may be obtained by performing various signal processes such as channel encoding, interleaving and scrambling with respect to a data block received from a Medium Access Control (MAC) layer. The bit stream may be called a codeword and is equivalent to a data block received from the MAC layer. The data block received from the MAC layer is also called a transmission block. The modulation scheme may include, but not limited to, Binary Phase Shift Keying (BPSK), Quadrature Phase Shift Keying (QPSK) and n-Quadrature Amplitude Modulation (QAM). Thereafter, the serial data symbol sequence is serial-to-parallel converted N data symbols by N data symbols (202). N data symbols are mapped to allocated N subcarriers out of a total of M subcarriers, and residual M-N subcarriers are padded with 0 (206). Thereafter, the data symbols mapped in the frequency domain are converted into a time-domain sequence by M-point IDFT processing (208). Thereafter, in order to reduce Inter-Symbol Interference (ISI) and Inter-Carrier Interference (ICI), CP is added to the time-domain sequence so as to generate OFDMA symbols (210). The generated OFDMA symbols are parallel-to-serial converted (212). Thereafter, the OFDMA symbols are subjected to procedures such as digital-to-analog conversion and frequency up-conversion and are transmitted to the receiver (214). Available subcarriers out of the residual M-N subcarriers are allocated to another user. An OFDMA receiver includes an RF/Analog-to-Digital Converter (ADC) module 216, a serial-to-parallel converter 218, a CP removal module 220, an M-point DFT module 224, a subcarrier demapping/equalization module 226, a parallel-to-serial converter 228 and a detection module 230. The signal processing procedure of the OFDMA receiver is configured inversely to the OFDM transmitter.

The SC-FDMA transmitter further includes the N-point DFT module 204 in the previous stage of the subcarrier mapping module 206, compared with an OFDMA transmitter. The SC-FDMA transmitter spreads plural pieces of data in the frequency domain by the DFT prior to the IDFT processing, thereby further reducing the PAPR of the transmitted signal, compared with the OFDMA scheme. The SC-FDMA receiver further includes the N-Point IDFT module 228 in the next stage of the subcarrier demapping module 226, compared with the OFDMA receiver. The signal processing procedure of the SC-FDMA receiver is configured inversely to the SC-FDMA transmitter.

The modules shown in FIG. 2 are only illustrative and the transmitter and/or the receiver may further include a necessary module, some of the modules or functions may be omitted or divided into different modules, or two or more modules may be combined into one module.

Figure 3:
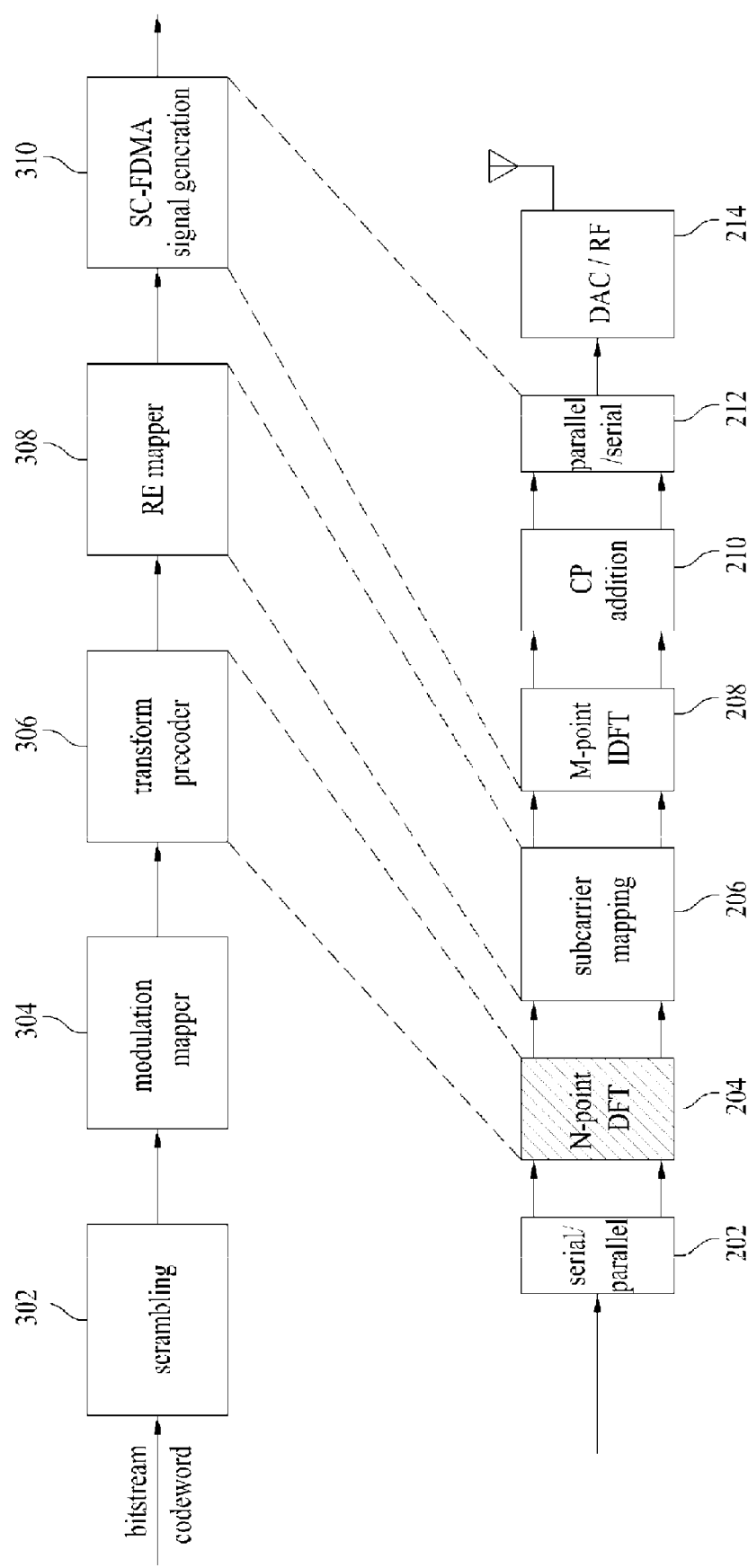
FIG. 3 is a view showing the architecture of an uplink transmitter defined in an LTE system.

FIG. 3 is a view showing the architecture of an uplink transmitter defined in an LTE system. The LTE system uses the SC-FDMA in uplink transmission and uses the OFDMA scheme in downlink transmission.

As shown in FIG. 3, the SC-FDMA transmitter includes a scrambling module 302, a modulation mapper 304, a transform precoder 306, a resource element mapper 308 and an SC-FDMA signal generation module 310. The signal processing procedure is as follows. The scrambling module 302 may scramble a bit stream using a specific scrambling code/sequence of a UE. The modulation mapper 304 modulates the scrambled signal into complex symbols using a scheme such as a BPSK, QPSK or 16QAM scheme according to the type of the signal and/or the channel state. Thereafter, the modulated complex symbols are processed by the transform precoder 306 and are then input to the resource element mapper 308. The resource element mapper 308 maps the complex symbols to scheduled subcarriers. Thereafter, the signals mapped to the subcarriers may be transmitted in uplink via the SC-FDMA signal generation module 310.

For reference, the transform precoder 306 corresponds to the N-point DFT module 204 of FIG. 2. The resource element mapper 308 corresponds to the subcarrier mapping module 206 of FIG. 2. The SC-FDMA signal generation module 310 corresponds to the M-point IDFT module 206, the CP adding module 210 and the parallel-to-serial converter 212 of FIG. 2. The modules shown in FIG. 3 are only illustrative and the SC-FDMA transmitter may further include a necessary module, some of the modules or functions may be omitted or divided into different modules, or two or more modules may be combined into one module.

Hereinafter, the signal processing procedure of the transform precoder 306 will be described in more detail. The data symbol sequence input to the transform precoder 306 may be complex symbols represented by $d(0), \ldots,$ and $d(M_{Symb}-1)$. The transform precoder 306 simultaneously processes N data symbols and divides the data symbol sequence into $M_{Symb}/N$ sets. The sets finally configure SC-FDMA symbols. N denotes the number of scheduled subcarriers. The data symbols input to the transform precoder 306 may be processed by the following Expression.

$$D(l \cdot N + k) = \frac{1}{\sqrt{N}} \sum_{i=0}^{N-1} d(l \cdot N + i) e^{-j\frac{2\pi \cdot i \cdot k}{N}}$$ [Expression 1]

$$k = 0, \ldots, N-1$$

$$l = 0, \ldots, M_{symb}/N - 1$$

The process of Expression 1 corresponds to a DFT process, and frequency-domain sequences represented by $D(0), \ldots, D(M_{Symb}-1)$ are generated by the transform precoder 306. The respective values of the frequency-domain sequences determine the sizes and the phases of the mapped subcarriers.

Figure 4:
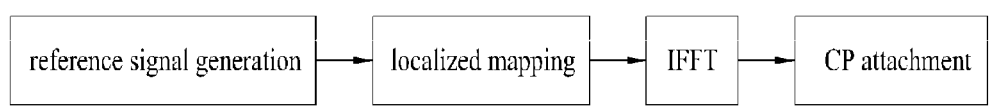
FIG. 4 is a block diagram illustrating a method for generating a Reference Signal (RS) in an SC-FDMA transmitter.

FIG. 4 is a block diagram illustrating a method for generating a Reference Signal (RS) in an SC-FDMA transmitter.

As shown in FIG. 4, the RS is immediately generated in the frequency domain. That is, the RS does not pass through a DFT precoder. The RS is generated using an orthogonal sequence, a quasi-orthogonal sequence, or a sequence having good correlation characteristics. For example, the RS may include a computer-generated sequence, a Zadoff-Chu (ZC) sequence, a Constant Amplitude Zero Autocorrelation Waveform (CAZAC) sequence, a Pseudo-random Noise (PN) sequence, or the like. Thereafter, the RS is mapped to a plurality of subcarriers in the frequency domain. The RS may be continuously or discontinuously mapped to the frequency domain. The RS mapped to the frequency domain is transformed into a time-domain signal through an IFFT. The time-domain signal is transmitted to a receiving end after a Cyclic Prefix (CP) is added to the signal.

Figure 5:
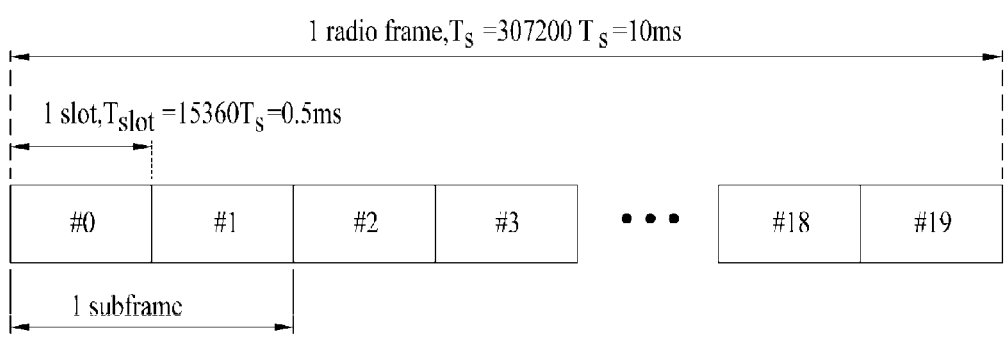
FIG. 5 is a view showing the architecture of a radio frame.

FIG. 5 is a view showing the architecture of a radio frame.

As shown in FIG. 5, the radio frame has a length of 10 ms and includes 10 subframes. Each of the subframes has a length of 1 ms and includes two slots. Each of the slots has a length of 0.5 ms. In FIG. 5, $T_S$ denotes a sampling time, which may be $T_S=1/(15\ \text{kHz}\times2048)=3.2552\times10^{-8}$ (about 33 ns). Each slot includes a plurality of transmission symbols in a time domain, and includes a plurality of resource blocks (RBs) in a frequency domain. A Transmission Time Interval (TTI) which is a unit time for transmission of data may be determined in units of one or more subframes. The structure of the radio frame is only exemplary and the number of subframes, the number of slots, and the number of transmission symbols may be variously changed.

Figure 6:
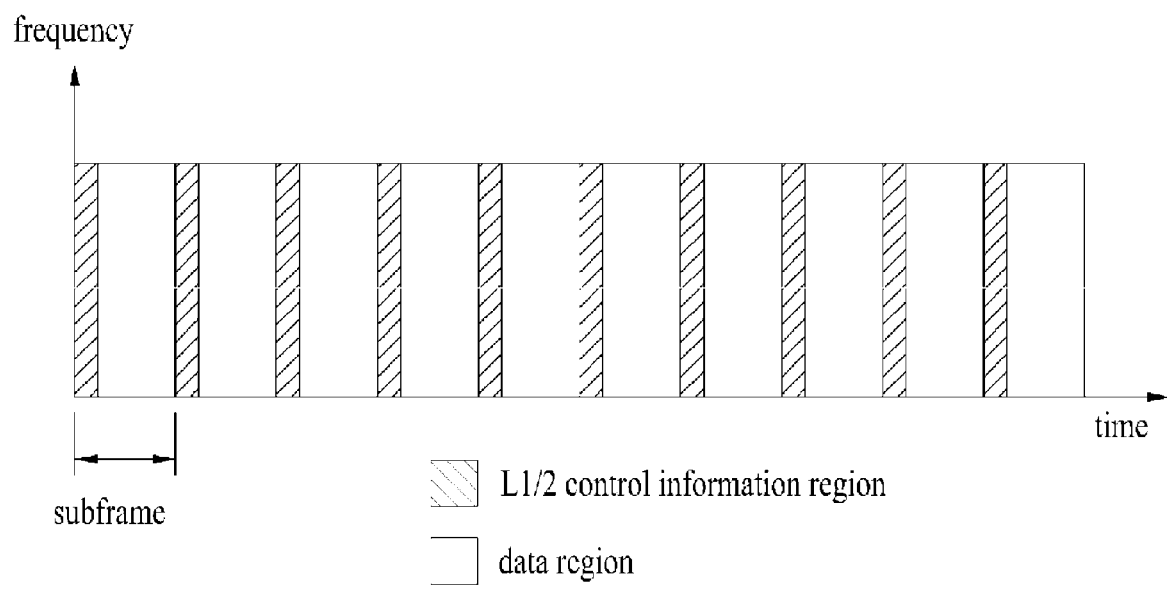
FIG. 6 is a view showing the architecture of a downlink physical channel.

FIG. 6 is a view showing the architecture of a downlink physical channel.

As shown in FIG. 6, each subframe includes a control region for transmitting scheduling information and other control information and a data region for transmitting downlink data. The control region starts from a first OFDMA symbol of the subframe and includes one or more OFDMA symbols. The size of the control region may be independently set with respect to each subframe. Various control channels including a Physical Downlink Control Channel (PDCCH) are mapped to the control region. The PDCCH is a physical downlink control channel, which is allocated to first n OFDM symbols of the subframe. The PDCCH includes one or more Control Channel Elements (CCEs). Each CCE includes 9 adjacent Resource Element Groups (REGs). Each REG includes four adjacent Resource Elements (REs) excluding a reference signal.

The PDCCH informs each UE of information associated with resource allocation of a Paging Channel (PCH) and a Downlink-Shared Channel (DL-SCH), uplink scheduling grant, Hybrid Automatic Repeat Request (HARQ) information, or the like. The information transmitted via the PDCCH is collectively referred to as Downlink Control Information (DCI). The PDCCH has various formats according to transmission information. The PDCCH format is also called a DCI format. For example, a DCI format 0 associated with uplink scheduling is shown in Table 1.

TABLE 1

| Field | Bits | Comment |
| --- | --- | --- |
| Format | 1 | Uplink grant or downlink assignment |
| Hopping flag | 1 | Frequency hopping on/off |
| RB assignment | 7 | — |
| MCS | 5 | — |
| DMRS | 3 | Cyclic shift of demodulation reference signal |
| . | . | . |
| . | . | . |
| . | . | . |
| RNTI/CRC | 16 | 16 bit RNTI implicitly encoded in CRC |
| Total | 38 | — |

MCS: Modulation and Coding Scheme
RNTI: Radio Network Temporary Identifier
CRC: Cyclic Redundancy Check Using a Radio Network Temporary Identifier (RNTI), it is identified to which UE the PDCCH is transmitted. For example, it is assumed that the PDCCH is CRC-masked with an RNTI "A", and uplink radio resource allocation information (e.g., frequency location) "B" and transmission format information (e.g., transmission block size, modulation scheme, coding information, or the like) "C" are transmitted. In this case, a UE located in a cell monitors a PDCCH using its own RNTI information, and a UE with "A" RNTI performs uplink transmission according to information "B" and "C" obtained from the PDCCH.

FIG. 7 is a view showing a resource grid of a slot. FIG. 7 is equally applicable to a downlink slot.

As shown in FIG. 7, the uplink slot includes a plurality of SC-FDMA symbols in a time domain, and includes a plurality of RBs in a frequency domain. Although, in FIG. 7, the uplink slot includes 7 SC-FDMA symbols and the RB includes 12 subcarriers, the present invention is not limited thereto. For example, the number of SC-FDMA symbols included in the uplink slot may be modified according to the length of a cyclic prefix. Elements on the resource grid are called resource elements. One RB includes 12×7 resource elements. The number $N^{UL}_{RB}$ of RBs included in the uplink slot depends on an uplink transmission bandwidth set in a cell.

SC-FDMA may be subdivided according to a method for mapping frequency-domain sequences generated by DFT precoding to subcarriers. For convenience, localized SC-FDMA and clustered SC-FDMA will be described.

Figure 8A:
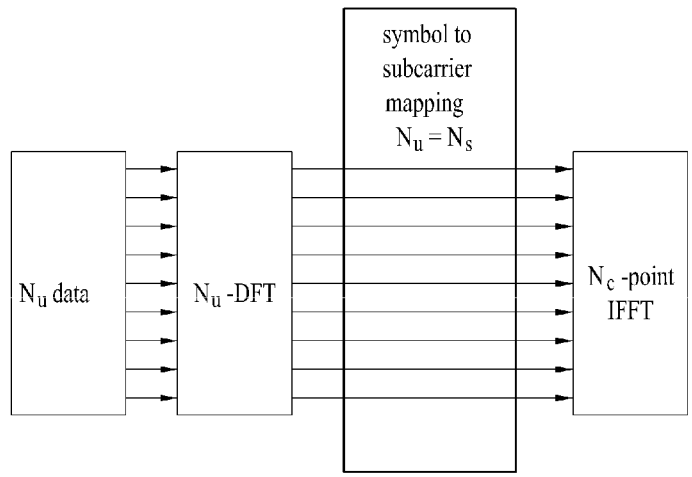
FIGS. 8A and 8B are views showing examples of localized SC-FDMA resource mapping.
Figure 8B:
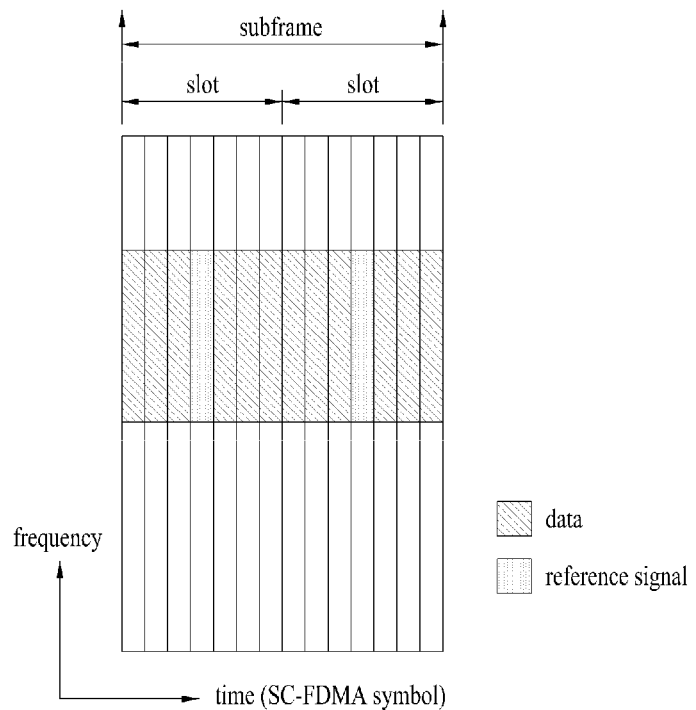

FIGS. 8A and 8B are views showing examples of localized SC-FDMA resource mapping.

As shown in FIG. 8A, $N_u$ data symbols are input to an $N_u$-DFT module. Here, $N_u$ denotes the number of subcarriers scheduled at a given time point. The $N_u$-DFT module generates frequency-domain sequences with a length of $N_u$, which are spread in the frequency domain, from the $N_u$ data symbols. The frequency-domain sequences output from the $N_u$-DFT module are continuously allocated to $N_u$ subcarriers within a system band (including $N_c$ subcarriers). Thereafter, a localized SC-FDMA symbol is generated through an $N_c$-point IFFT module.

As shown in FIG. 8B, in the case of a normal CP, each slot may include 7 SC-FDMA symbols and data that has been subjected to DFT precoding may be mapped to a plurality of consecutive subcarriers. A resource is generated in the frequency domain and is mapped to a 4th SC-FDMA symbol of each slot. In the case of an extended CP, each slot may include 6 SC-FDMA symbols and a reference signal may be mapped to a 3rd SC-FDMA symbol of each slot. Since the localized SC-FDMA symbol has a single carrier characteristic on a time axis, a PAPR is smaller than that of an OFDMA symbol. Although the localized SC-FDMA scheme can perform frequency selective scheduling, it reduces scheduling flexibility. For example, a transmitter and a receiver cannot simultaneously transmit data through a plurality of separated frequency regions having good radio channel response characteristics.

Figure 9A:
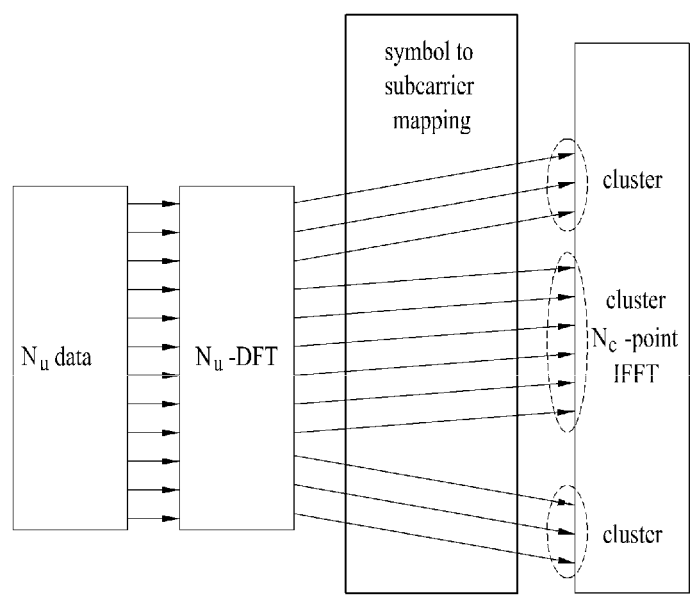
FIGS. 9A, 9B, and 9C are views showing examples of clustered SC-FDMA resource mapping.
Figure 9B:
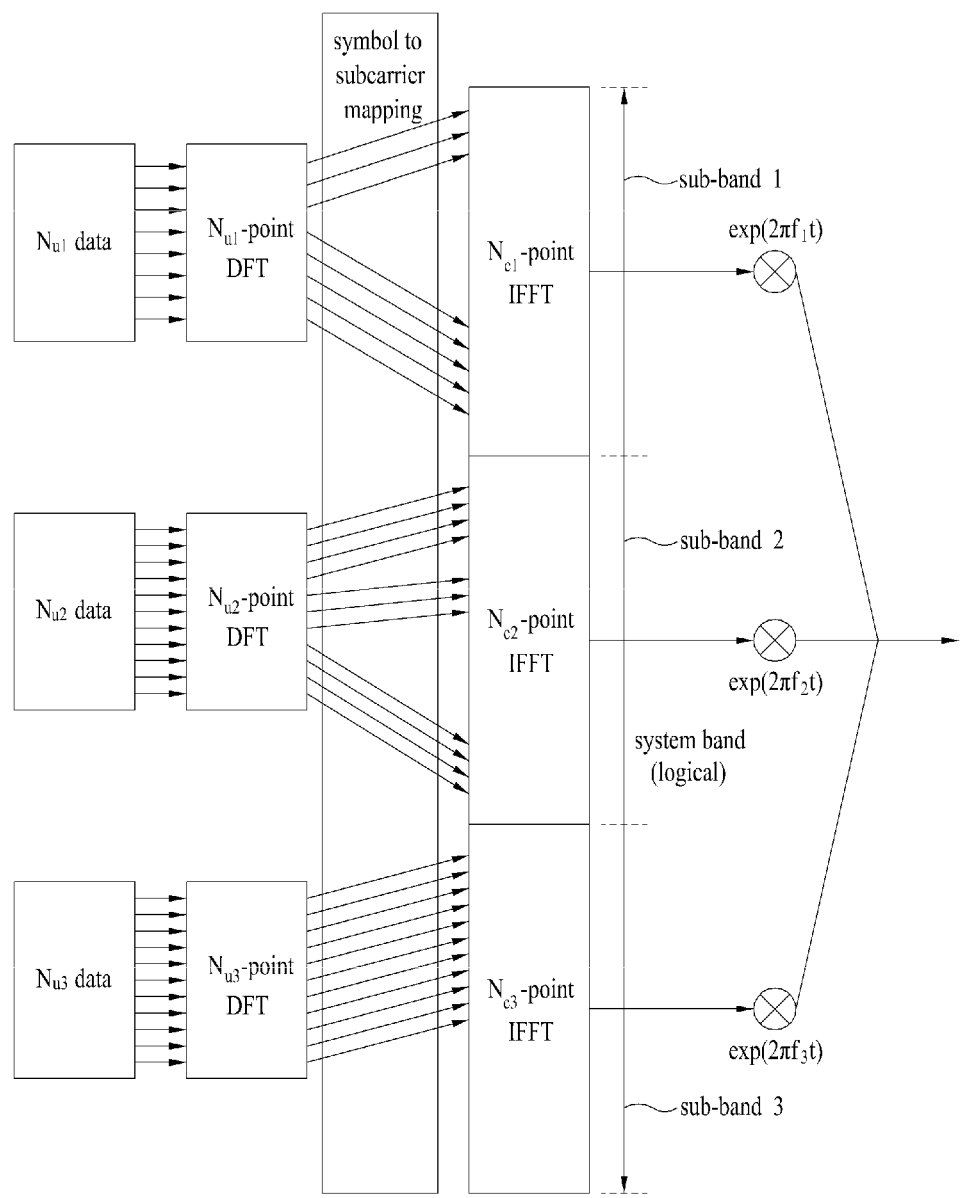

FIGS. 9A and 9B are views showing examples of clustered SC-FDMA resource mapping.

As shown in FIG. 9A, the $N_u$-DFT module generates frequency-domain sequences with a length of $N_u$, which are spread in the frequency domain, from the $N_u$ data symbols. The frequency-domain sequences output from the $N_u$-DFT module are discontinuously mapped to one or more clusters set within a system band ($N_c$ subcarriers) by a subcarrier mapping process. The cluster indicates a frequency band to which the localized SC-FDMA scheme is applied and includes one or more continuous subcarriers. Accordingly, the data symbols are discontinuously mapped to a plurality of clusters in a frequency domain, and are continuously mapped to one or more subcarriers within each of the clusters. Thereafter, clustered SC-FDMA symbols may be generated by an $N_c$-point IFFT module.

As shown in FIG. 9B, in the case where the system band includes a plurality of sub-bands, the SC-FDMA scheme may be separately performed for each sub-band. Here, each sub-band may be a component carrier used for a carrier aggregation. Each sub-band may be adjacent to each other or may be separated from each other in the frequency domain. In this embodiment, it is assumed that the system band includes three sub-bands. The size of each sub-band may be equal or unequal. Basically, the SC-FDMA scheme is applied to each sub-band in the same manner as described above with reference to FIG. 9A. IFFT may be performed for the entire system band or may be performed on a sub-band basis as shown. Each SC-FDMA symbol generated through IFFT may be transmitted using a single central carrier or may be transmitted in units of subbands using different central carriers as shown.

Figure 9C:
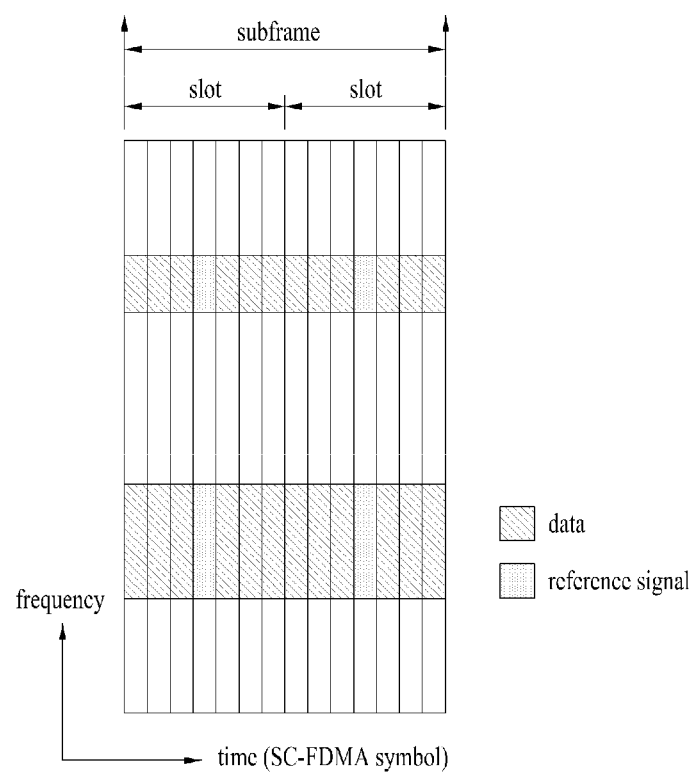

As shown in FIG. 9C, in the case of a normal CP, each slot may include 7 SC-FDMA symbols and data that has been subjected to DFT precoding may be mapped to one or more clusters. A reference signal may be generated in the frequency domain and may then be mapped to a 4th SC-FDMA symbol of each slot. The example of FIG. 9C shows the case where the number of clusters is 2. The sizes of the clusters (e.g., the number of subcarriers) may be equally or independently set. In the case of an extended CP, each slot may include 6 SC-FDMA symbols and a reference signal may be mapped to a 3rd SC-FDMA symbol of each slot. In the clustered SC-FDMA symbols, since a single carrier characteristic is broken on a time axis, a PAPR is slightly increased. However, if the number of clusters is set in a proper range, it is possible to improve scheduling flexibility while securing a smaller PAPR than the OFDMA scheme.

Figure 10:
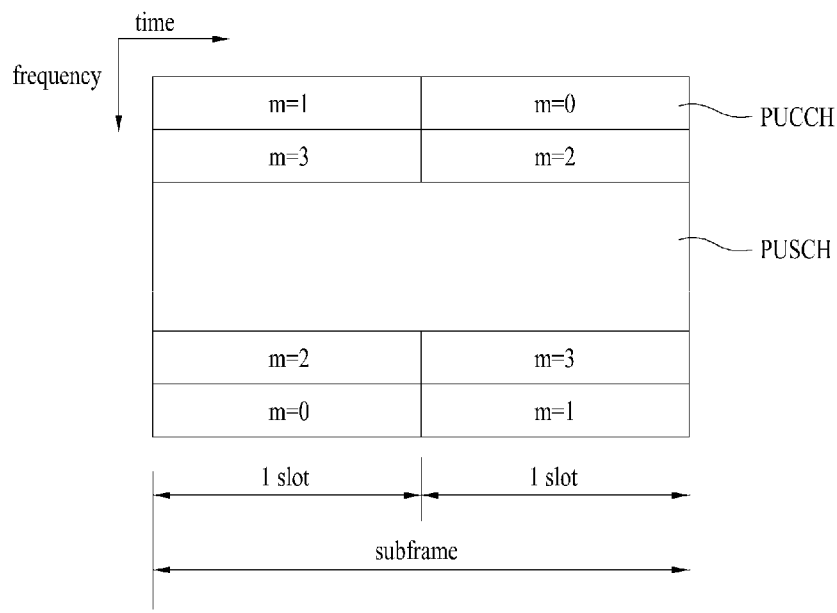
FIG. 10 illustrates a structure of an uplink subframe.

FIG. 10 illustrates an uplink subframe structure.

As shown in FIG. 10, an uplink subframe may be divided into a region to which a Physical Uplink Control CHannel (PUCCH) carrying control information is allocated and a region to which a Physical Uplink Shared CHannel (PUSCH) carrying user data is allocated. The center part of the subframe is allocated to the PUSCH, and both-side parts of the data region are allocated to the PUCCH in the frequency domain. Control information transmitted over the PUCCH includes an Acknowledgement/Negative-Acknowledgement (ACK/NACK) used in a Hybrid Automatic Repeat Request (HARQ), a Channel Quality Indictor (CQI) indicating a downlink channel state, a Rank Indicator (RI) for MIMO, a scheduling request (SR) which is as a UL resource allocation request, etc.

A PUCCH for one UE uses one resource block (RB) that occupies a different frequency in each slot of the subframe. That is, two RBs allocated to a PUCCH are frequency-hopped at a slot boundary. FIG. 10 illustrates an example in which a PUCCH of m=0, a PUCCH of m=1, a PUCCH of m=2, and a PUCCH of m=3 are allocated to a subframe. The PUCCH may support multiple formats. That is, uplink control information having a different number of bits per subframe depending on a used modulation scheme may be transmitted within a PUCCH. For example, 1-bit control information may be transmitted within a PUCCH when a Binary Phase Shift Keying (BPSK) is used and 2-bit control information may be transmitted within a PUCCH when a Quadrature Phase Shift Keying (QPSK) is used.

Table 2 illustrates a PUCCH format in an LTE system.

TABLE 2

| PUCCH format | Information | Modulation scheme | Number of bits per subframe |
|---|---|---|---|
| 1 | Scheduling Request(SR) | N/A (OOK) | N/A |
| 1a | ACK/NACK | BPSK | 1 |
| 1b | ACK/NACK | QPSK | 2 |
| 2 | CQI | QPSK | 20 |
| 2a | CQI + ACK/NACK | QPSK + BPSK | 21 |
| 2b | CQI + ACK/NACK | QPSK + QPSK | 22 |

OOK: On-Off Keying
N/A: Not-Available

Table 3 illustrates the number of reference signals for demodulation per slot according to the PUCCH format.

TABLE 3

| PUCCH format | Normal CP | Extended CP |
|---|---|---|
| 1, 1a, 1b | 3 | 2 |
| 2 | 2 | 1 |
| 2a, 2b | 2 | N/A |

Figure 11A:
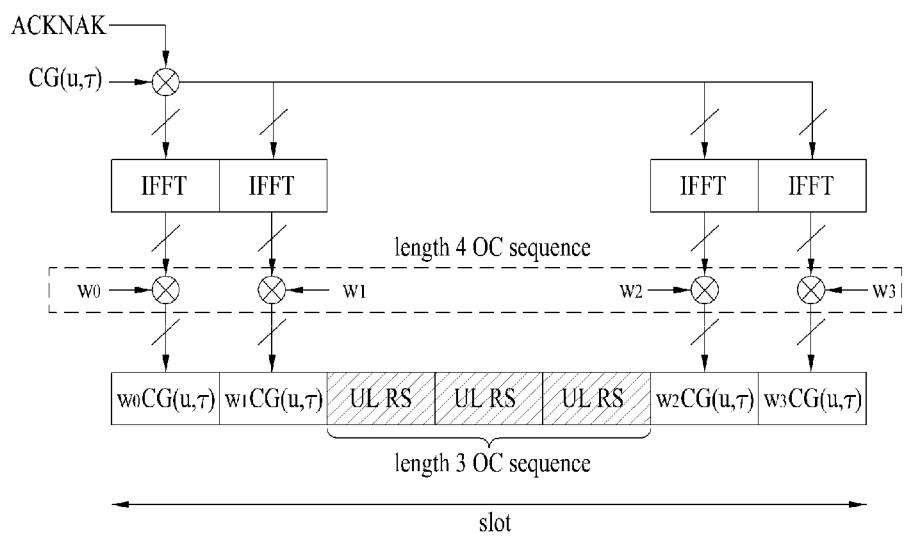
FIGS. 11A and 11B illustrate PUCCH structures.

FIG. 11A illustrates a PUCCH 1a/1b structure. An ACK/NACK signal is transmitted in this structure.

As shown in FIG. 11A, in the case of a normal CP, each slot includes 7 SC-FDMA symbols. A reference signal is carried within 3 consecutive SC-FDMA symbols and an ACK/NACK signal is carried within 4 remaining SC-FDMA symbols. In the case of an extended CP, each slot includes 6 SC-FDMA symbols and a reference signal is carried within the 3rd and 4th SC-FDMA symbols. Resources for ACK/NACK signals are identified using different Walsh/DFT orthogonal codes (time spreads) and different Cyclic Shifts (CSs) of a Computer Generated Constant Amplitude Zero Auto Correlation (CG-CAZAC). After IFFT, the signal is multiplied by w0, w1, w2, and w3. The same result is obtained when the signal is multiplied by w0, w1, w2, and w3 before IFFT. Resource blocks for the ACK/NACK signal are allocated so as to be orthogonal to each other in the frequency domain. Assuming that the number of available cyclic shifts is 6 and the number of available Walsh/DFT codes is 3, 18 UEs may be multiplexed within one Resource Block (RB).

Figure 11B:
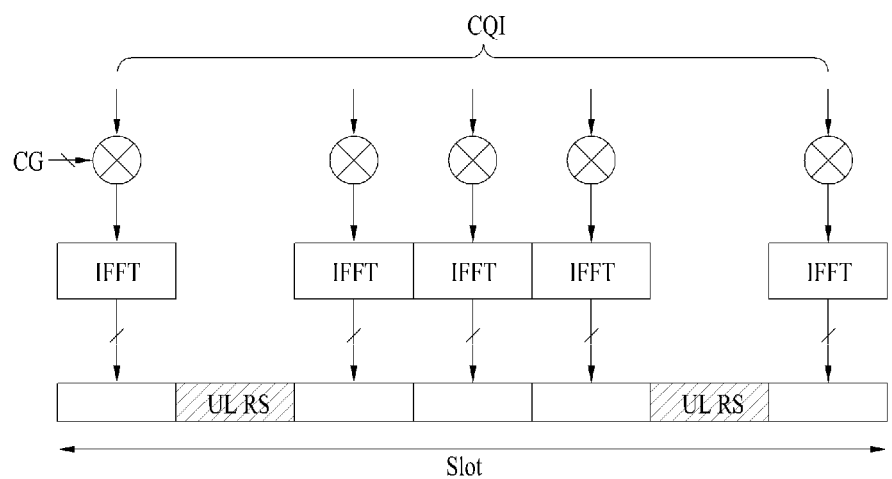

FIG. 11B illustrates a PUCCH 1a/1b structure. A CQI signal is transmitted in this structure.

As shown in FIG. 11B, in the case of a normal CP, each slot includes 7 SC-FDMA symbols and a reference signal is carried within 2nd and 6sh SC-FDMA symbols. A CQI signal is carried within the remaining SC-FDMA symbols. In the case of an extended CP, each slot includes 6 SC-FDMA symbols and a reference signal is carried within the 4th SC-FDMA symbol. The CQI is modulated and carried over the entire SC-FDMA symbol and each SC-FDMA symbol is configured as one sequence. That is, the UE modulates and transmits a CQI in each sequence. The CQI is modulated in a QPSK scheme and a subframe may carry a CQI value of up to 20 bits. A reference signal may be UE-multiplexed in a Code Division Multiplexing (CDM) manner through cyclic shift. For example, when the number of available cyclic shifts is 12, 12 UEs may be multiplexed in the same RB and, when the number of available cyclic shifts is 6, 6 UEs may be multiplexed in the same RB.

The following is a more detailed description of PUCCH resources. The PUCCH resources include frequency resource blocks, orthogonal codes, and cyclic shifts of sequences.

Expression 2 represents a basic CG-CAZAC sequence of length 12.

$$\bar{r}_u(n) = e^{j\phi(n)\pi/4} \quad \text{[Expression 2]}$$

Here, u and $\phi(n)$ are the same as defined in Table 5 and n is an integer in a range of 0 to 11.

TABLE 4

| u | $\phi(0), \ldots, \phi(11)$ | | | | | | | | | | | |
|---|---|---|---|---|---|---|---|---|---|---|---|---|
| 0  | -1 | 1  | 3  | -3 | 3  | 3  | 1  | 1  | 3  | 1  | -3 | 3  |
| 1  | 1  | 1  | 3  | 3  | 3  | -1 | 1  | -3 | -3 | 1  | -3 | 3  |
| 2  | 1  | 1  | -3 | -3 | -3 | -1 | -3 | -3 | 1  | -3 | 1  | -1 |
| 3  | -1 | 1  | 1  | 1  | 1  | -1 | -3 | -3 | 1  | -3 | 3  | -1 |
| 4  | -1 | 3  | 1  | -1 | 1  | -1 | -3 | -1 | 1  | -1 | 1  | 3  |
| 5  | 1  | -3 | 3  | -1 | -1 | 1  | 1  | -1 | -1 | 3  | -3 | 1  |
| 6  | -1 | 3  | -3 | -3 | -3 | 3  | 1  | -1 | 3  | 3  | -3 | 1  |
| 7  | -3 | -1 | -1 | -1 | 1  | -3 | 3  | -1 | 1  | -3 | 3  | 1  |
| 8  | 1  | -3 | 3  | 1  | -1 | -1 | -1 | 1  | 1  | 3  | -1 | 1  |
| 9  | 1  | -3 | -1 | 3  | 3  | -1 | -3 | 1  | 1  | 1  | 1  | 1  |
| 10 | -1 | 3  | -1 | 1  | 1  | -3 | -3 | -1 | -3 | -3 | 3  | -1 |
| 11 | 3  | 1  | -1 | -1 | 3  | 3  | -3 | 1  | 3  | 1  | 3  | 3  |
| 12 | 1  | -3 | 1  | 1  | -3 | 1  | 1  | 1  | -3 | -3 | -3 | 1  |
| 13 | 3  | 3  | -3 | 3  | -3 | 1  | 1  | 3  | -1 | -3 | 3  | 3  |
| 14 | -3 | 1  | -1 | -3 | -1 | 3  | 1  | 3  | 3  | 3  | -1 | 1  |
| 15 | 3  | -1 | 1  | -3 | -1 | -1 | 1  | 1  | 3  | 1  | -1 | -3 |
| 16 | 1  | 3  | 1  | -1 | 1  | 3  | 3  | 3  | -1 | -1 | 3  | -1 |
| 17 | -3 | 1  | 1  | 3  | -3 | 3  | -3 | -3 | 3  | 1  | 3  | -1 |
| 18 | -3 | 3  | 1  | 3  | -3 | 1  | 1  | 1  | 1  | -3 | -3 | -3 |
| 19 | -1 | 3  | 1  | 3  | 1  | -1 | -1 | 3  | -3 | -1 | -3 | -1 |
| 20 | -1 | -3 | 1  | 1  | 1  | 1  | 3  | 1  | -1 | 1  | -3 | -1 |
| 21 | -1 | 3  | -1 | 1  | -3 | -3 | -3 | -3 | -3 | 1  | -1 | -3 |
| 22 | 1  | 1  | -3 | -3 | -3 | -3 | -1 | 3  | -3 | 1  | -3 | 3  |
| 23 | 1  | 1  | -1 | -3 | -1 | -3 | 1  | -1 | 1  | 3  | -1 | 1  |

TABLE 4-continued

| u | $\phi(0), \ldots, \phi(11)$ | | | | | | | | | | | |
|---|---|---|---|---|---|---|---|---|---|---|---|---|
| 24 | 1  | 1  | 3  | 1  | 3  | 3  | -1 | 1  | -1 | -3 | -3 | 1  |
| 25 | 1  | -3 | 3  | 3  | 1  | 3  | 3  | 1  | -3 | -1 | -1 | 3  |
| 26 | 1  | 3  | -3 | -3 | 3  | -3 | 1  | -1 | -1 | 3  | -1 | -3 |
| 27 | -3 | -1 | -3 | -1 | -3 | 3  | 1  | -1 | 1  | 3  | -3 | -3 |
| 28 | -1 | 3  | -3 | 3  | -1 | 3  | 3  | -3 | 3  | 3  | -1 | -1 |
| 29 | 3  | -3 | -3 | -1 | -1 | -3 | -1 | 3  | -3 | 3  | 1  | -1 |

Tables 5 and 6 illustrate orthogonal sequences of lengths 4 and 3 used in each PUCCH.

TABLE 5

| Sequence index $n_{oc}$ ($n_s$) | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 6

| Sequence index $n_{oc}$ ($n_s$) | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Table 7 illustrates an orthogonal sequence used in a reference signal.

TABLE 7

| Sequence index $\bar{n}_{oc}$ ($n_s$) | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Expression 3 represents a Physical Resource Block (PRB) used for PUCCH transmission in slot $n_S$.

$$n_{PRB} = \begin{cases} \left\lfloor \frac{m}{2} \right\rfloor & \text{if } (m + n_s \bmod 2) \bmod 2 = 0 \\ N_{RB}^{UL} - 1 - \left\lfloor \frac{m}{2} \right\rfloor & \text{if } (m + n - s \bmod 2) \bmod 2 = 1 \end{cases} \quad \text{[Expression 3]}$$

Here, m is determined according to a PUCCH format. Specifically, "m" which is determined according to PUCCH formats 1/1a/1b and 2/2a/2b as represented in Expressions 4 and 5.

$$m = \begin{cases} N_{RB}^{(2)} & \text{if } n_{PUCCH}^{(1)} < c \cdot N_{cs}^{(1)}/\Delta_{shift}^{PUCCH} \\ \left\lfloor \frac{n_{PUCCH}^{(1)} - c \cdot N_{cs}^{(1)}/\Delta_{shift}^{PUCCH}}{c \cdot N_{sc}^{RB}/\Delta_{shift}^{PUCCH}} \right\rfloor + N_{RB}^{(2)} + \left\lceil \frac{N_{cs}^{(1)}}{8} \right\rceil & \text{otherwise} \end{cases} \quad \text{[Expression 4]}$$

$$c = \begin{cases} 3 & \text{normal cyclic prefix} \\ 2 & \text{extended cyclic prefix} \end{cases}$$

$$m = \lfloor n_{PUCCH}^{(2)}/N_{sc}^{RB} \rfloor \quad \text{[Expression 5]}$$

FIG. 12 illustrates ACK/NACK channelization for a PUCCH format 1a/1b. This example is similarly applied to the PUCCH format 2/2a/2b.

As shown in FIG. 12, ACK/NACK channelization is determined based on a combination of orthogonal covering (OC) and a cyclic shift (CS) of a CG-CAZAC sequence. ACK/NACK channels are combined so as to be as far away from each other as possible in CS and OC resources. A CS difference ($\Delta^{PUCCH}_{Shift}$) between adjacent ACK/NACK channels is determined for each cell and has a value of 1, 2, or 3. In this embodiment, it is assumed that the CS difference ($\Delta^{PUCCH}_{Shift}$) is 2. In this case, ACK/NACK channelization is performed using OC resources after it is performed using CS resources. When the resources for ACK/NACK channels are represented in the form of (CS, OC), the resources for ACK/NACK channels are given as (1,0), (3,0), (5,0), (9,0), (11,0), (2,1), (4,1), (6,1), . . . , (7, 2), (9, 2), (11, 2). ACK/NACK resources (i.e., CS, Walsh/DFT code, and frequency RB resources) for non-persistent scheduling are linked to a CCE index having a lowest PDCCH allocated for scheduling and are automatically determined accordingly. In the case of persistent scheduling, information regarding ACK/NACK resources is explicitly signaled to the UE one time.

Figures 13, 14:
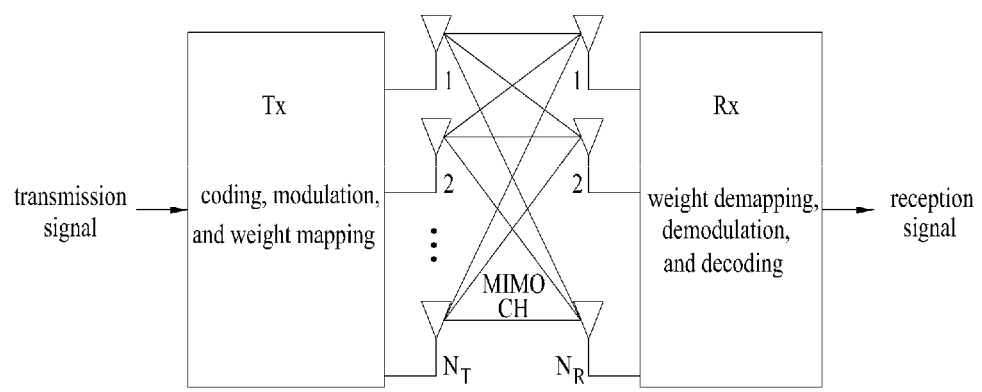
FIG. 13 illustrates ACK/NACK and CQI channelization in a hybrid structure.
FIG. 14 illustrates an exemplary configuration of a radio communication system that uses multiple antennas.

FIG. 13 illustrates ACK/NACK and CQI channelization in a hybrid structure.

As shown in FIG. 13, resources for ACK/NACK and CQI are identified by CSs. For example, CSs of 0 to 3 may be used for ACK/NACK channelization and CSs of 5 to 10 may be used for CQI channelization. In this case, CSs of 4 and 11 may be used as guard CSs for avoiding interference between channels. In FIGS. 12 and 13, CSs may be hopped on a symbol basis to randomize interference between cells. CS/OC may be remapped on a slot basis.

As described above, resources of PUCCH format 1/1a/1b are configured as combinations of a Cyclic Shift (CS), orthogonal covering (OC), and a Resource Block (RB). For example, when the number of CS indices is 6 (ncs0 to ncs5), the number of OC indices is 3 (noc0 to noc2), and the number of RBs is 3 (nrb0 to nrb2), a total of 54 (=6×3×3) resource elements may be allocated to each UE. That is, a total of 54 indices (index 0 to index 53) may be rearranged as combinations of nr=(nrc, noc, nrb). Similarly, PUCCH format 2/2a/2b resources are configured as combinations of a Cyclic Shift (CS) and a Resource Block (RB). For example, when the number of CS indices is 6 (ncs0 to ncs5) and the number of RBs is 3 (nrb0 to nrb2), a total of 18 (=6×3) resource elements may be allocated to each UE.

The following is a more detailed description of a reference signal used for a PUSCH. In the LTE system, a reference signal is configured as a CG-CAZAC or CAZAC sequence. Expression 6 represents a reference signal for a PUSCH.

$$r^{PUSCH}(m \cdot M^{RS}_{sc}+n)=r_{u,v}^{(\alpha)}(n)=e^{j\alpha n}\bar{r}_{u,v}(n) \quad \text{[Expression 6]}$$

Here, m is 0 or 1, n is an integer in a range from 0 to $M^{RS}_{SC}-1$, and $M^{RS}_{SC}$ denotes the number of scheduled sub-carriers. u denotes a group index which is an integer in a range of 1 to 29. v denotes a basic sequence number belonging to each group. Each group includes one basic sequence for resources of 5 or less RBs and two basic sequences for resources of 6 or more RBs. α denotes a Cyclic Shift (CS) value and is defined as $2\pi \cdot n_{CS}/12$. $n_{CS}$ is expressed as Expression 7.

$$n_{cs}=(n_{DMRS}^{(1)}+n_{DMRS}^{(2)}+n_{PRS}(n_s)) \bmod 12 \quad \text{[Expression 7]}$$

Here, $n^{(1)}_{DMRS}$ denotes a broadcast value and $n^{(2)}_{DMRS}$ is indicated by scheduling as illustrated in Table 9. $n_{PRS}(n_S)$ denotes a cell-specific CS value and varies depending on the slot number ($n_S$). $np_{RS}(n_S)$ may be expressed as Expression 8.

$$n_{PRS}(n_s)=\Sigma_{i=0}^{7}c(8\cdot n_s+i)\cdot 2^i \quad \text{[Expression 8]}$$

Here, c(i) is a cell-specific Pseudo-random Noise (PN) sequence. The PN sequence generator is initialized as a value as expressed in Expression 9.

$$c_{init}=\left\lfloor \frac{N_{ID}^{cell}}{30} \right\rfloor \cdot 2^5 + f_{ss}^{PUSCH} \quad \text{[Expression 9]}$$

TABLE 9

| Cyclic Shift Field in DCI format 0 | $n_{DMRS}^{(2)}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

Physical mapping of a reference signal for a PUSCH is performed in the following manner. A sequence $r^{PUSCH}(\bullet)$ is multiplied by an amplitude scaling factor $\beta_{PUSCH}$ and is mapped to a physical RB used for corresponding PUSCH transmission, starting from $r^{PUSCH}(0)$.

FIG. 14 illustrates an exemplary configuration of a radio communication system using multiple antennas. The term "MIMO technology" refers to technology for performing communication using multiple transmission antennas and/or multiple reception antennas.

The MIMO technology includes a transmit diversity (TxD) scheme for increasing transmission reliability using symbols passing through various channel paths and a spatial multiplexing (SM) scheme for simultaneously transmitting a plurality of data symbols using a plurality of transmission antennas so as to improve transfer rate. Recently, research into a proper combination of the two schemes for obtaining the respective advantages of the schemes is ongoing. The following is a more detailed description of each of the schemes.

First, the transmit diversity scheme includes a space-time block coding (STBC) scheme and a space-time trellis coding scheme simultaneously using a diversity gain and a coding gain. In general, the space-time trellis coding scheme is excellent in terms of bit error rate improvement performance and degree of freedom in code generation, but the space-time block coded scheme is simple in terms of computational complexity. The transmit diversity gain is an amount corresponding to the product of the number of transmission antennas and the number of reception antennas. The transmit diversity scheme includes a Cyclic Delay Diversity (CDD), Precoding Vector Switching (PVS), Time Switched Transmit Diversity (TSTD), Single Carrier-Space Frequency Block Coding (SC-SFBC), STBC-II, Frequency Shift Time Diversity (FSTD), and the like.

Second, in the spatial multiplexing scheme, different data streams are transmitted via respective transmission antennas. At this time, since interference is generated between data simultaneously transmitted from the transmitter, the receiver detects a signal after eliminating the interference using a proper signal processing scheme. Examples of the interference eliminating scheme include a Maximum Likelihood (ML) scheme, a Zero Forcing (ZF) scheme, a Minimum Mean Square Error (MMSE) scheme, a Diagonal Bell laboratories Layered Space-Time (D-BLAST) scheme, a Vertical Bell laboratories Layered Space-Time (V-BLAST) scheme, and the like. If the transmitter can have channel information, a Singular Value Decomposition (SVD) scheme or the like may be used.

Third, a hybrid of the transmit diversity scheme and the spatial multiplexing scheme may be used. If only the spatial diversity gain is obtained, a performance improvement gain according to the increase in diversity order is gradually saturated and, if only a spatial multiplexing gain is obtained, transmission reliability is reduced in a radio channel. Such a hybrid scheme includes a Double-Space Time Transmit Diversity (D-STTD) scheme, a Space Time Bit-Interleaved Coded modulation (STBICM) scheme, and the like.

Equation 6 represents signals $x_1, x_2, \ldots, x_{N_T}$ that are transmitted through transmit antennas.

$$x = \begin{bmatrix} x_1 \\ x_2 \\ \vdots \\ x_i \\ \vdots \\ x_{N_T} \end{bmatrix}$$

[Equation 6]

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s} = WPs$$

Here, $w_{ij}$ denotes a weight applied between an ith transmit antenna and S denotes a power-adjusted information vector S. W denotes a weight or precoding matrix. W is appropriately distributed to each antenna according to a channel state.

In the spatial multiplexing scheme, since different signals are transmitted in a state of being multiplexed, all the elements of the information vector S have different values. In contrast, in the transmit diversity scheme, since the same signal is transmitted via several channel paths, all the elements of the information vector S have the same value. A method for mixing the spatial multiplexing scheme and the transmit diversity scheme may be considered. For example, the same signal may be transmitted via three transmission antennas and different signals may be respectively transmitted via the residual transmission antennas.

Equation 7 represents signals $y_1, y_2, \ldots, y_{N_R}$ that are transmitted through receive antennas when NR transmit antennas are present.

$$y = \begin{bmatrix} y_1 \\ y_2 \\ \vdots \\ y_i \\ \vdots \\ y_{N_R} \end{bmatrix}$$

[Equation 7]

-continued $$= \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n = HWPs + n = \tilde{H}s + n$$

Here, H denotes a channel matrix and $h_{ij}$ denotes a channel from a transmit antenna j to a receive antenna i.

Meanwhile, the rank of the matrix is defined by a minimum number of the number of independent rows or columns. Accordingly, the rank rank(H) of the channel matrix H is restricted as follows.

$$\text{rank}(H) \leq \min(N_T, N_R)$$

[Equation 8]

The rank may be defined by the number of Eigen values excluding 0, when the matrix is subjected Eigen value decomposition. Similarly, the rank may be defined by the number of singular values excluding 0, when singular value decomposition is performed. Accordingly, the physical meaning of the rank in the channel matrix is a maximum value of pieces of different information, which can be transmitted via a given channel.

In a multi-antenna system, a transmitter and a receiver may share a codebook for applying the MIMO technology. The codebook is a predefined set of precoding matrices or vectors. The precoding matrix has a size of $N_T \times N_L$. $N_T$ denotes the number of (physical or logical) antennas used for signal transmission, and $N_L$ denotes the number of layers. That is, the layers correspond to the (physical or logical) antennas and a relationship between the layers and the antennas may be determined by the precoding matrix. The number of layers may be determined according to the rank of the channel matrix. The precoding matrix may be configured in a nested format. Meanwhile, if two antenna ports are used in LTE, the codebook is defined as shown in Table 9. If four antenna ports are used, the codebook may refer to 3GPP TS36.211.

TABLE 9

| Codebook | Number of layers υ | |
| index | 1 | 2 |
| --- | --- | --- |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

Figure 15:
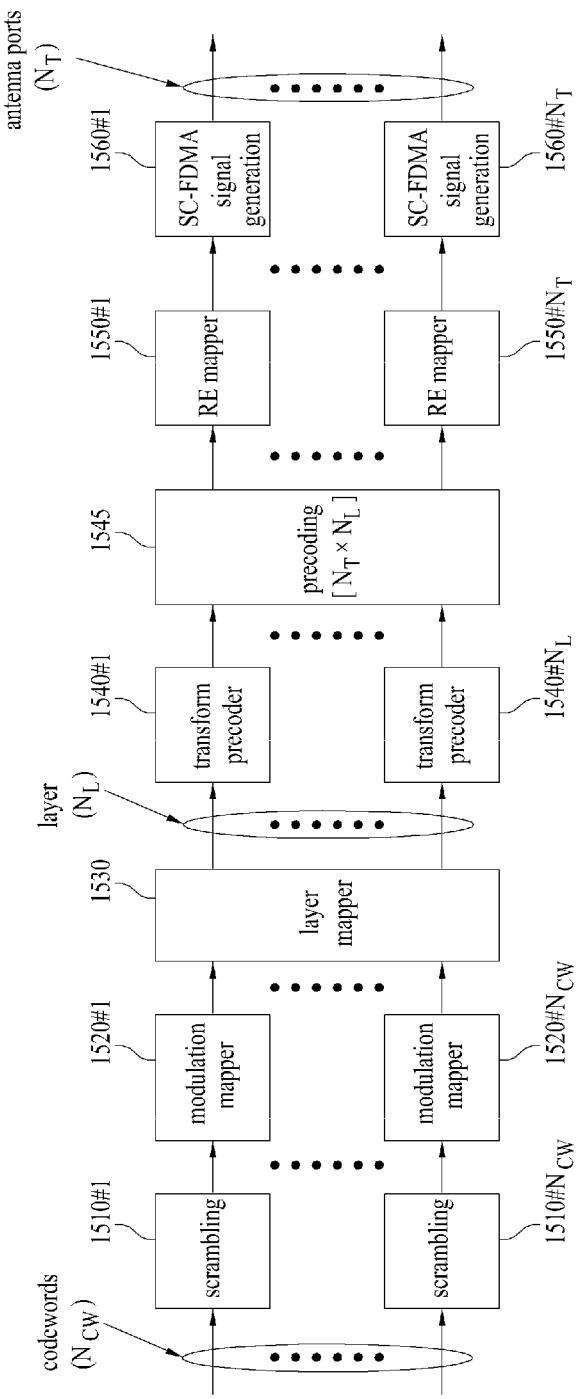
FIG. 15 illustrates an exemplary SC-FDMA transmitter that supports multiple antennas.

FIG. 15 is a view showing an example of an SC-FDMA transmitter for supporting multiple antennas.

As shown in FIG. 15, scrambling module 1510#1 to 1510#$N_{CW}$ may scramble $N_{CW}$ codewords (CW) using specific scrambling codes/sequences of a UE. The $N_{CW}$ scrambled signals are input to modulation mappers 1520#1 to 1520#$N_{CW}$ so as to be modulated to complex symbols by a BPSK, QPSK or 16QAM scheme according to the kinds of the transmitted signals and/or the channel states. Thereafter, the $N_{CW}$ modulated complex symbols are mapped to $N_L$ layers by a layer mapper 1530. The layers are DFTed by respective transformer precoders 1540#1 to 1540#$N_T$. A precoder 1545 maps the $N_L$ DFTed layers to $N_T$ streams corresponding to the antenna ports using precoding vectors/matrices. That is, a relationship between the layers and the antennas may be determined by the precoding vectors/matrices. Resource element mappers 1550#1 to 1550#$N_T$ map the $N_T$ streams to subcarriers. SC-FDMA signal generators 1560#1 to 1560#$N_T$ convert the signals mapped to the subcarriers into transmission symbols in the time domain and then transfer the symbols to the antenna ports. The antenna ports are mapped to the physical antennas through antenna virtualization. Although the layer mapper 1530 and the precoder 1545 are illustrated as separate modules in this embodiment, the functions of the layer mapper 1530 and the precoder 1545 may be integrated as a single module. For example, the functions of the layer mapper 1530 may be incorporated into the precoder 1545 and the functions of the precoder 1545 may be incorporated into the layer mapper 1530. In addition, although the precoder 1545 is illustrated as being located in the transform precoders 1540#1 to 1540#$N_T$ in this embodiment, the precoder 1545 may also be located before the transform precoders 1540#1 to 1540#$N_T$ or after an IFFT module (not shown).

Figure 16:
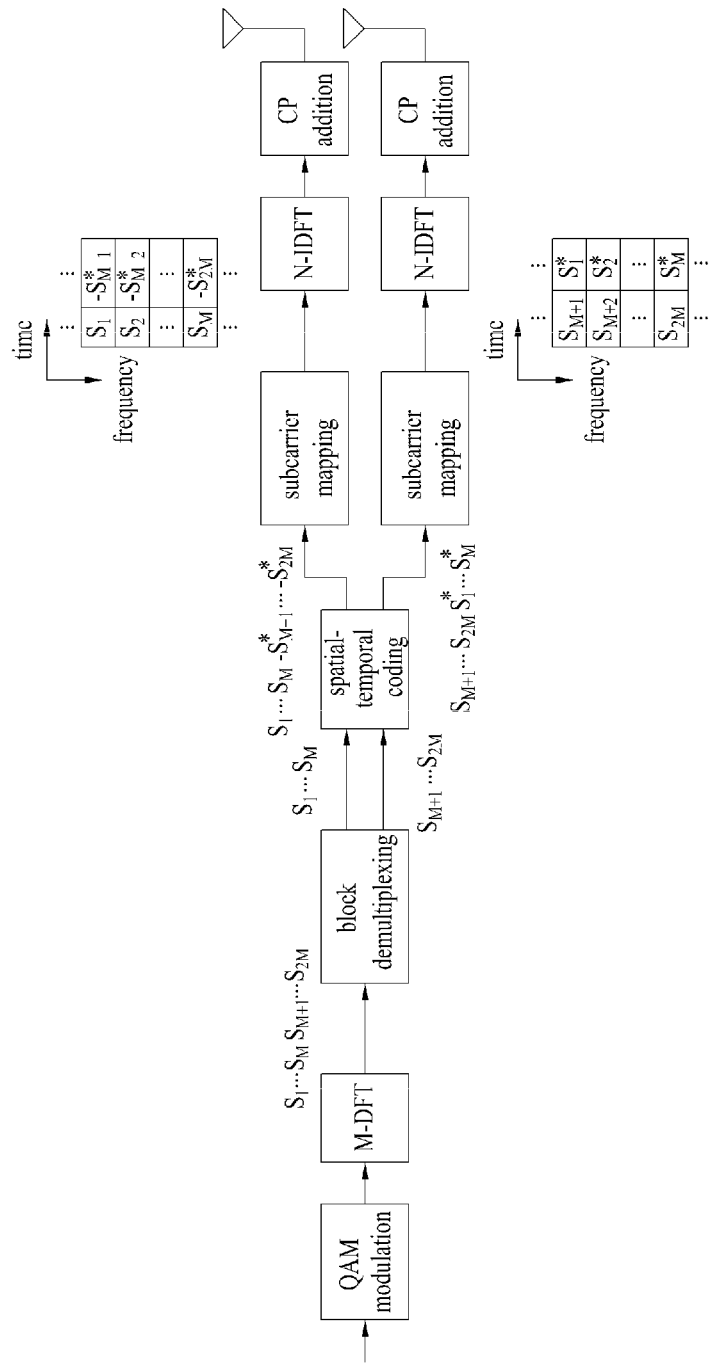
FIG. 16 illustrates a Sequence Time Block Coding (STBC) scheme.

FIG. 16 illustrates a Sequence Time Block Coding (STBC) scheme. STBC is a scheme which performs frequency-time block coding to acquire transmit diversity gain while satisfying single carrier characteristics so as to lower Cubic Metric (CM) characteristics.

As shown in FIG. 16, it is assumed that a QAM symbol of length 2M is generated from information bits through QAM symbol modulation. Length M-point DFT coding is performed on the QAM symbol of length 2M to perform STBC mapping.

Antenna #0, OFDM symbol #0=>Symbols of indices 0 to M−1 are mapped after being DFTed.

Antenna #1, OFDM symbol #0=>Symbols of indices M to 2M−1 are mapped after being DFTed.

Antenna #0, OFDM symbol #1=>Symbols of indices M to 2M−1 are DFTed and multiplied by "−1" and are then mapped after complex conjugation is performed (or the DFTed value used when the antenna #1, OFDM symbol #0 mapping is performed is multiplied by "−1" and then complex conjugation is performed).

Antenna #1, OFDM symbol #1=>Symbols of indices 0 to M−1 are DFTed and multiplied by "−1" and are then mapped after complex conjugation is performed (or the DFTed value used for when the antenna #0, OFDM symbol #0 mapping is performed is multiplied by "−1" and then complex conjugation is performed).

When the STBC scheme is applied to a PUCCH format 2/2a/2b, the STBC scheme may be applied to modulation symbols before or after being spread using orthogonal resources.

Figure 17:
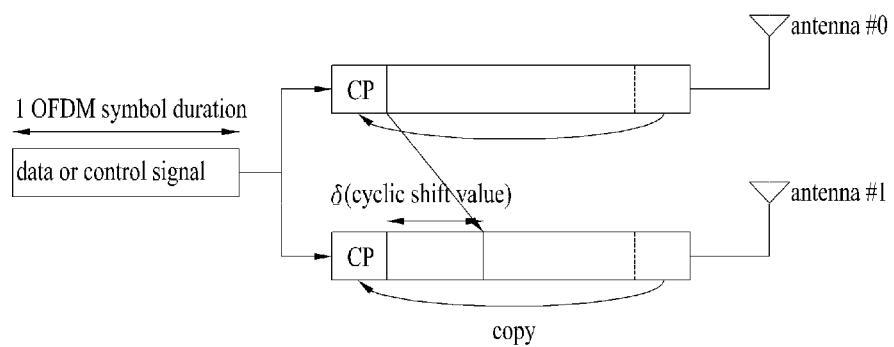
FIG. 17 illustrates Cyclic Delay Diversity (CDD)

FIG. 17 illustrates Cyclic Delay Diversity (CDD).

As shown in FIG. 17, in the CDD scheme, the same signal is transmitted through multi-antenna transmission and a different cyclic shift (or linear delay) is applied to a signal corresponding to an OFDM symbol unit or a specific period unit for each antenna to acquire diversity gain. In this embodiment, although the same information is transmitted through antenna #0 and antenna #1, a symbol transmitted through antenna #1 is cyclically shifted by δ.

Figure 18:
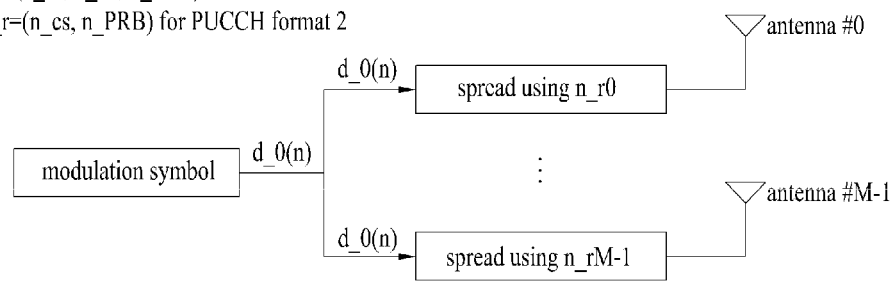
FIG. 18 illustrates an Orthogonal Space Resource Transmission (OSRT) scheme.

FIG. 18 illustrates an Orthogonal Space Resource Transmission (OSRT) scheme. The OSRT scheme is also referred to as an Orthogonal Resource Transmission (ORT) scheme.

As shown in FIG. 18, modulation symbols transmitted through multiple antennas may use different orthogonal resources. Examples of the orthogonal resources include cyclic shift, orthogonal covering, and frequency resource block. That is, resources (such as cyclic shift, orthogonal covering, and frequency resource block) of modulation symbols transmitted through multiple antennas are set to be orthogonal to each other, thereby guaranteeing orthogonality between UEs while acquiring high diversity gain. This embodiment is illustrated with reference to the case where modulation symbols (d_0(n)) are spread using different sequences for multiple antennas. The OSRT scheme may be applied to PUCCH transmission.

As described above, the LTE-A system requires that multiple antennas be used in uplink and a variety of MIMO transmission schemes are under consideration in the LTE-A system. In this regard, there is a need to define UE operations for the MIMO transmission scheme (for example, TxD scheme and SM scheme). For example, in the case of a PUCCH, in order to use a 2-TxD scheme, two different resources indicated by a combination of a CS, an OC, and a PRB are needed to estimate respective channels of multiple antennas from the viewpoint of reference signal. In another example, in the case of a PUCCH, two CSs need to be allocated to estimate respective channels of antennas from the viewpoint of reference signal or two resources (or two resource units) multiplexed in an FDM/TDM manner need to be allocated to perform antenna channel estimation.

Accordingly, it is necessary for the base station (eNode B) to configure a multi-antenna transmission mode (MIMO transmission mode) of the UE according to UE multiplexing or resource states. For example, let us assume that 18 UEs can be multiplexed in a CDM/FDM fashion when all UEs perform 1-Tx antenna transmission for a PUCCH. In this case, when 2-Tx antenna transmission is used, the UE uses 2 PUCCH resources and therefore the capacity of multiplexing is reduced to 9 UEs. Accordingly, it is necessary for the base station to configure a multi-antenna transmission scheme for the UE in accordance with situations.

The following is a detailed description with reference to the drawings. In this specification, the term "N-Tx transmission" or "N-Tx antenna transmission" refers to transmission that requires channel estimation for each of the N antennas. The term "N-Tx transmission" may also be referred to as a transmission mode for N layer transmission. For example, in the case where a UE has 4 physical antennas and performs 2-Tx antenna transmission, two of the four antennas may use STBC, SFBC, OSRT, and the like and the remaining two antennas may use a virtualization method such as CDD or PVS. That is, although the UE performs transmission using four antennas, it appears to the base station that the UE performs transmission using two antennas.

Figure 19:
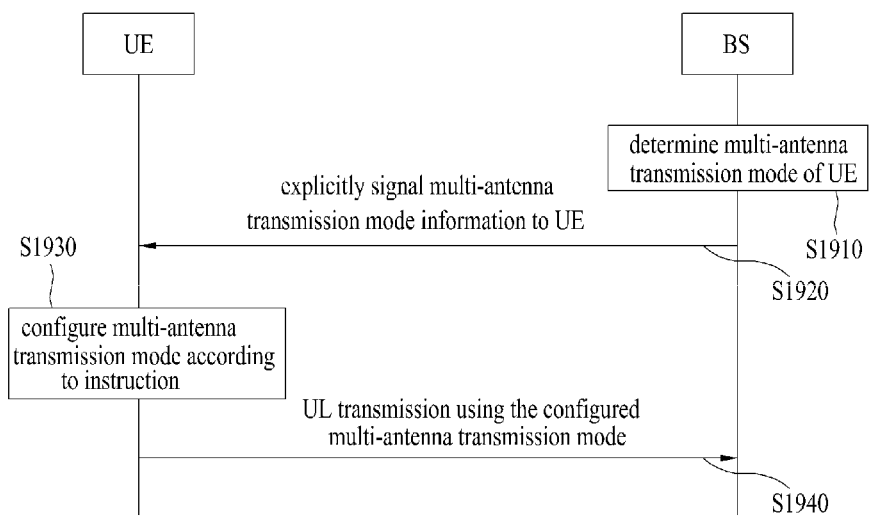

FIG. 19 illustrates a procedure in which uplink transmission is performed through multiple antennas according to an embodiment of the present invention.

As shown in FIG. 19, the base station determines a multi-antenna transmission mode of the UE (for example, transmit diversity, spatial multiplexing, and the like) (S1910). The multi-antenna transmission mode may be determined taking into consideration the channel condition, the number of UEs that are going to perform uplink transmission, and the like. Thereafter, the base station signals information regarding the multi-antenna transmission mode to the UE (S1920). The information regarding the multi-antenna transmission mode may include information indicating whether or not a MIMO transmission scheme is used, the MIMO transmission scheme, the number of antennas that require channel estimation, and the like. For example, the information regarding the multi-antenna transmission mode may include information indicating whether or not transmit diversity (TxD) is used. In this case, the information regarding the multi-antenna transmission mode may indicate whether or not 1-TxD, 2-TxD, 4-TxD, or the like are used. In addition, the information regarding the multi-antenna transmission mode may include information indicating whether or not spatial multiplexing (SM) is used. In this case, the information regarding the multi-antenna transmission mode may include rank information, information regarding the number of layers, and the like. The information regarding the multi-antenna transmission mode may be transmitted through one of system information, Radio Resource Control (RRC) signaling, and uplink scheduling information. The information regarding the multi-antenna transmission mode may be transmitted through a newly added field or may be transmitted through a field that is not being used among predefined fields. The information regarding the multi-antenna transmission mode may be transmitted in a periodic, aperiodic, persistent, semi-persistent, or event-triggering manner. The UE configures its multi-antenna transmission mode as indicated by the base station (S1930). Thereafter, the UE transmits an uplink signal through multiple antennas according to the configured multi-antenna transmission mode (S1940). The uplink signal may be transmitted through an uplink channel including a plurality of SC-FDMA symbols. In this case, the uplink channel includes a PUCCH or a PUSCH.

Figure 20:
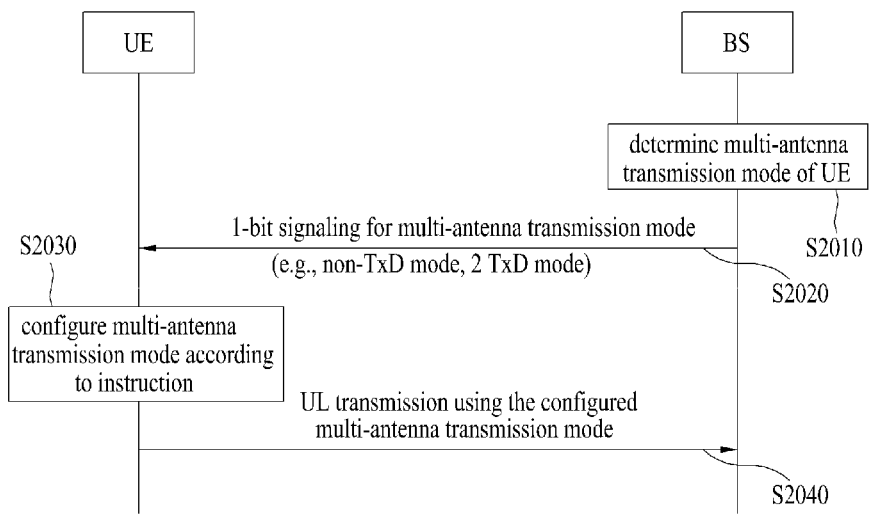

FIG. 20 illustrates a procedure in which uplink transmission is performed through multiple antennas according to another embodiment of the present invention.

As shown in FIG. 20, the base station determines a multi-antenna transmission mode of the UE (for example, transmit diversity, spatial multiplexing, and the like) (S2010). The multi-antenna transmission mode may be determined taking into consideration the channel condition, the number of UEs that are going to perform uplink transmission, and the like. Thereafter, the base station signals 1-bit information regarding the multi-antenna transmission mode to the UE (S2020). The 1-bit information may indicate a non-TxD mode or a TxD mode. For example, the 1-bit information may indicate a non-TxD mode when the 1-bit information is set to 0 and indicate a 2-TxD mode when the 1-bit information is set to 1. The 1-bit information may also be interpreted reversely. In addition, the 1-bit information may indicate a non-SM mode or an SM mode. For example, the 1-bit information may indicate a mode for transmission of 1 layer when the 1-bit information is set to 0 and indicate a mode for transmission of 2 layers when the 1-bit information is set to 1. The 1-bit information may be transmitted through one of system information, Radio Resource Control (RRC) signaling, and uplink scheduling information. The 1-bit information may be transmitted through a newly added field or may be transmitted through a field that is not being used among predefined fields. The 1-bit information may be transmitted in a periodic, aperiodic, persistent, semi-persistent (broadcast channel), or event-triggering (UE-RRC signaling) manner. The UE configures its multi-antenna transmission mode as indicated by the base station (S2030). Thereafter, the UE transmits an uplink signal through multiple antennas according to the configured multi-antenna transmission mode (S2040). The uplink signal may be transmitted through an uplink channel including a plurality of SC-FDMA symbols. In this case, the uplink channel includes a PUCCH or a PUSCH.

Figure 21:
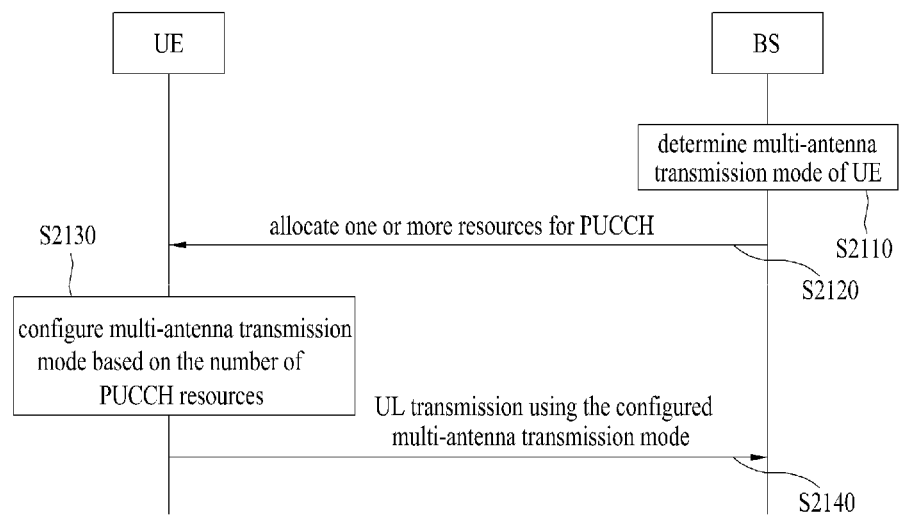

FIG. 21 illustrates a procedure in which uplink transmission is performed through multiple antennas according to another embodiment of the present invention.

As shown in FIG. 21, the base station determines a multi-antenna transmission mode of the UE (for example, transmit diversity, spatial multiplexing, and the like) (S2110). The multi-antenna transmission mode may be determined taking into consideration the channel condition, the number of UEs that are going to perform uplink transmission, and the like. Thereafter, the base station allocates one or more PUCCH resources to the UE (S2120). The PUCCH resources that can be allocated to the UE may be implicitly derived according to the multi-antenna transmission mode determined in step S2110. For example, the PUCCH resources that can be allocated to the UE may be implicitly derived according to the number of antennas determined in step S2110 and a corresponding transmission mode. The PUCCH resources may be indicated by (CS, OC, PRB) or (CS, PRB) according to the format. Resources for the reference signal may be indicated by (CS, OC, PRB). The maximum number of PUCCH resources may be set to be equal to or less than the number of antennas of the UE. For example, when the number of antennas of the UE is 4, the maximum number of PUCCH resources may be set to 2 or 4. The PUCCH resources may be allocated using system information, Radio Resource Control (RRC) signaling, or uplink scheduling information. In this case, the PUCCH resources may be transmitted through a newly added field or may be allocated through a field that is not being used among predefined fields. In addition, the PUCCH resources may be allocated using PDCCH configuration information. For example, resources associated with a PUCCH format 1a/1b for transmitting an ACK/NACK signal may be checked based on information (for example, a last CCE index) regarding CCEs constituting the PDCCH. The PUCCH resources may be allocated in a periodic, aperiodic, persistent, semi-persistent, or event-triggering manner. Thereafter, the UE configures a multi-antenna transmission mode based on the number of PUCCH resources allocated by the base station (S2130). That is, the number of resources allocated by the base station may be connected to the multi-antenna transmission mode (for example, the number of antennas and a corresponding transmission mode). For example, when the base station has allocated one resource (or one resource unit), the UE may configure the multi-antenna transmission mode to 1-TxD or its equivalent method such as CDD or PVS. Similarly, when the base station has allocated two resources, the UE may configure the multi-antenna transmission mode to 2-TxD (for example, STBC, SFBC, large delay CDD, OSRT, or the like). Similarly, when the base station has allocated four resources (or four resource units), the UE may configure the multi-antenna transmission mode to 4-TxD. For example, when the base station has allocated one resource, the UE may configure the multi-antenna transmission mode to a transmission mode for one layer transmission. Similarly, when the base station has allocated two resources, the UE may configure the multi-antenna transmission mode to a transmission mode for two layer transmission. Similarly, when the base station has allocated four resources, the UE may configure the multi-antenna transmission mode to a transmission mode for four layer transmission. Thereafter, the UE transmits an uplink signal through multiple antennas according to the configured multi-antenna transmission mode (S2140). The uplink signal may be transmitted through an uplink channel including a plurality of SC-FDMA symbols. In this case, the uplink channel includes a PUCCH or a PUCCH.

Figure 22:
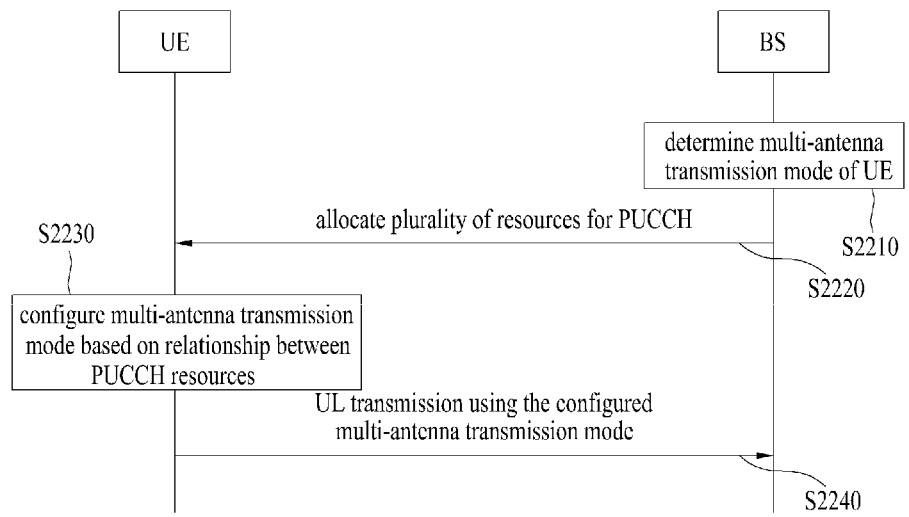

FIG. 22 illustrates a procedure in which uplink transmission is performed through multiple antennas according to another embodiment of the present invention.

As shown in FIG. 22, the base station determines a multi-antenna transmission mode of the UE (for example, transmit diversity, spatial multiplexing, and the like) (S2210). The multi-antenna transmission mode may be determined taking into consideration the channel condition, the number of UEs that are going to perform uplink transmission, and the like. Thereafter, the base station allocates a plurality of PUCCH resources to the UE (S2220). A relationship between PUCCH resources that can be allocated to the UE may be implicitly derived according to the multi-antenna transmission mode determined in step S2210. For example, the PUCCH resources that can be allocated to the UE may be implicitly derived according to the number of antennas determined in step S2210 and a corresponding transmission mode. The PUCCH resources may be indicated by (CS, OC, PRB) or (CS, PRB) according to the format. Resources for the reference signal may be indicated by (CS, OC, PRB). The number of PUCCH resources may be fixed to a specific value equal to or less than the number of antennas of the UE. For example, when the number of antennas of the UE is 4, the number of PUCCH resources may always be fixed to 2 or 4. The PUCCH resources may be allocated using system information, Radio Resource Control (RRC) signaling, or uplink scheduling information. In this case, the PUCCH resources may be transmitted through a newly added field or may be allocated through a field that is not being used among predefined fields. In addition, the PUCCH resources may be allocated using PDCCH configuration information. For example, resources associated with a PUCCH format 1a/1b for transmitting an ACK/NACK signal may be checked based on information (for example, last CCE information) regarding CCEs constituting the PDCCH. The PUCCH resources may be allocated in a periodic, aperiodic, persistent, semi-persistent, or event-triggering manner.

Thereafter, the UE configures a multi-antenna transmission mode based on a relationship between PUCCH resources allocated by the base station (S2230). That is, the relationship between resources allocated by the base station may be connected to the multi-antenna transmission mode (for example, the number of antennas and a corresponding transmission mode). For example, the UE may configure a multi-antenna transmission mode based on whether or not the allocated PUCCH resources are identical. In one method, two fields indicating resources to be used for each antenna (or layer 0) may be defined for 2-Tx antenna transmission. In this case, the UE may perform 2-Tx antenna transmission (for example, STBC, SFBC, large delay CDD, or OSRT) when the two fields have different values and may perform 1-Tx antenna transmission or corresponding transmission when the two fields have the same value. Let us consider another method in which it is assumed that the base station has allocated nr0 and nr1 to the UE. Here, nr0 represents (ncs0, noc0, n_PRB0) for the PUCCH format 1/1a/1b and represents (ncs0, n_PRB0) for the PUCCH format 2/2a/2b. Here, ncs represents a cyclic shift value, noc represents orthogonal covering value, and n_PRB represents a value regarding a physical resource block. In this case, the UE may configure the multi-antenna transmission mode such that the UE performs 1-Tx antenna transmission using the corresponding resources when nr0=nr1 and performs 2-Tx antenna transmission using the corresponding resources when nr0≠nr1. Here, the order (or sequence) of allocation may correspond to that of a respective antenna (or layer). That is, signaling of (nr0, nr1) may indicate that nr0 has been allocated for antenna 0 (or layer 0) and nr1 has been allocated for antenna 1 (or layer 1). That is, the resources and the antennas may have the relationship of (nr0, nr1, nr2, nr3)<->(ant0, ant1, ant2, ant3). Here, ant may indicate an antenna port (or layer). That is, the UE may perform transmission using a Tx transmission method in which multiple antennas can be grouped and assumed as one antenna when the resources allocated for respective antennas (or layers) have the same value and may perform transmission using a predefined multi-antenna transmission mode (for example, transmit diversity, spatial multiplexing, or the like) when the resources allocated for respective antennas (or layers) have different values. The following is a more detailed description of the case where (nr0, nr1, nr2, nr3) are allocated. Although it is assumed in the present invention that a resource is allocated to each antenna (or each layer), the present invention is not limited to the illustrated order of antennas.

4-Tx antenna transmission may be performed when nr0≠nr1≠nr2≠nr3.

Transmission may be performed using only ant1, ant2, and ant3 when nr0=nr1≠nr2≠nr3 or transmission of ant0 may be performed such that it appears that transmission is performed through 3-Tx antennas.

Transmission of only ant0 and ant2, transmission of only ant0 and ant3, transmission of only ant1 and ant2, and transmission of only ant1 and ant2 may be performed when nr0=nr1≠nr2≠nr3. Transmission of ant0 and ant1 may be performed such that it appears that single antenna transmission is performed and transmission of ant2 and ant3 may be performed such that it appears that single antenna transmission is performed, resulting in that it appears from the overall viewpoint that 2-Tx transmission is performed.

FIG. 23 illustrates a procedure in which uplink transmission is performed through multiple antennas according to another embodiment of the present invention.

As shown in FIG. 23, the base station determines a multi-antenna transmission mode of the UE (for example, transmit diversity, spatial multiplexing, and the like) (S2310). The multi-antenna transmission mode may be determined taking into consideration the channel condition, the number of UEs that are going to perform uplink transmission, and the like. Thereafter, the base station signals the number of Tx antennas that require channel estimation (S2320). The number of Tx antennas requiring channel estimation may be implicitly derived according to the multi-antenna transmission mode determined in step S2310. For example, the number of Tx antennas requiring channel estimation may be implicitly derived according to the number of antennas determined in step S2310 and a corresponding transmission mode. The number of Tx antennas requiring channel estimation may be allocated using system information, Radio Resource Control (RRC) signaling, or uplink scheduling information. In this case, the number of Tx antennas requiring channel estimation may be transmitted through a newly added field or may be allocated through a field that is not being used among predefined fields. The number of Tx antennas requiring channel estimation may be allocated in a periodic, aperiodic, persistent, semi-persistent, or event-triggering manner.

The number of Tx antennas requiring channel estimation may be indicated through the number of CDM/FDM/TDM resources for a reference signal. The reference signal resources may be indicated by CS, OC, and PRB or an arbitrary combination thereof. For example, the reference signal resources may be indicated using CS. In this case, the UE may configure the multi-antenna transmission mode according to the number of allocated resources (S2330). That is, the number of resources allocated by the base station may be connected to the multi-antenna transmission mode (for example, the number of antennas and a corresponding transmission mode). For example, the UE may configure the multi-antenna transmission mode to a 1-Tx transmission mode when the number of allocated resources is 1, a 2-Tx transmission mode when the number of allocated resources is 2, and a 4-Tx transmission mode when the number of allocated resources is 4. Thereafter, the UE transmits an uplink signal to the base station through multiple antennas using the configured multi-antenna transmission mode (S2340). In this case, the UE transmits a reference signal for a plurality of antennas to the base station using the allocated resources.

In another scheme, in step S2330, only "N" for N-Tx transmission may be signaled as the number of Tx antennas requiring channel estimation. In this case, the UE configures the multi-antenna transmission mode to N-Tx transmission. Thereafter, the UE transmits an uplink signal to the base station through multiple antennas using the configured multi-antenna transmission mode (S2340). In this case, the UE may derive a reference signal resource for the nth antenna (or layer) using the resource of the 1st antenna (or layer). For example, the UE may use reference signal resources defined in the conventional (LTE) system as reference signal resources for the first antenna and may use reference signal resources acquired through a predetermined scheme for the remaining antennas. In exemplary implementation, when the first antenna uses ncs0, the second antenna may transmit a reference signal using ncs0+α, the third antenna may transmit a reference signal using ncs0+2×α, and the fourth antenna may transmit a reference signal using ncs0+3×α. Here, ncs represents a cyclic shift value. The uplink signal may be transmitted through an uplink channel including a plurality of SC-FDMA symbols. In this case, the uplink channel includes a PUCCH or a PUSCH.

FIG. 24 illustrates a procedure in which uplink transmission is performed through multiple antennas according to another embodiment of the present invention.

As shown in FIG. 24, the base station determines a multi-antenna transmission mode of the UE (for example, transmit diversity, spatial multiplexing, and the like) (S2410). The multi-antenna transmission mode may be determined taking into consideration the channel condition, the number of UEs that are going to perform uplink transmission, and the like. Thereafter, the base station allocates a plurality of resources to the UE for a reference signal (RS) for a PUSCH channel (S2420). A relationship between reference signal resources that can be allocated to the UE may be implicitly derived according to the multi-antenna transmission mode determined in step S2410. For example, the relationship between reference signal resources that can be allocated to the UE may be implicitly derived according to the number of antennas determined in step S2410 and a corresponding transmission mode. The reference signal resources may be indicated by CS, OC, and PRB or an arbitrary combination thereof. For example, the reference signal resources may be indicated using CS. The number of reference signal resources may be fixed to a specific value equal to or less than the number of antennas of the UE. For example, when the number of antennas of the UE is 4, the number of reference signal resources may always be fixed to 2 or 4. The reference signal resources may be allocated using uplink scheduling information. Table 10 shows uplink scheduling information (DCI format 0) that has been modified so as to indicate a plurality of reference signal resources.

TABLE 10

| Field | Bits | Comment |
|---|---|---|
| Format | 1 | Uplink grant or downlink assignment |
| Hopping flag | 1 | Frequency hopping on/off |
| RB assignment | 7 | — |
| MCS | 5 | — |
| DMRS#1 | 3 | Cyclic shift of demodulation reference signal |
| . | . | — |
| . | . | |
| . | . | |
| DMR#N | 3 | Cyclic shift of demodulation reference signal |
| . | . | |
| . | . | |
| . | . | |
| RNTI/CRC | 16 | 16 bit RNTI implicitly encoded in CRC |
| Total | 38 + N × 3 | — |

Thereafter, the UE configures a multi-antenna transmission mode based on a relationship between reference signal resources allocated by the base station (S2430). That is, the relationship between resources allocated by the base station may be connected to the multi-antenna transmission mode (for example, the number of antennas and a corresponding transmission mode). For example, the UE may configure a multi-antenna transmission mode based on whether or not the allocated reference signal resources are identical. In one method, two fields indicating resources to be used for each antenna (or layer) may be defined for 2-Tx antenna transmission. In this case, the UE may perform 2-Tx antenna transmission (for example, STBC, SFBC, large delay CDD, or OSRT) when the two fields have different values and may perform 1-Tx antenna transmission or corresponding transmission when the two fields have the same value. Specifically, let us assume that the base station has allocated ncs0 and ncs1 to the UE. Here, ncs represents a cyclic shift value. In this case, the UE may configure the multi-antenna transmission mode such that the UE performs 1-Tx antenna transmission when ncs0=ncs1 and performs 2-Tx antenna transmission when ncs0≠ncs1. Here, the order (or sequence) of allocation may correspond to that of a respective antenna (or layer). That is, signaling of (ncs0, ncs1) may indicate that ncs0 has been allocated for antenna 0 (or layer 0) and ncs1 has been allocated for antenna 1 (or layer 1). That is, the resources and the antennas may have the relationship of (ncs0, ncs1, ncs2, ncs3)<->(ant0, ant1, ant2, ant3). Here, ant may indicate an antenna port (or layer). That is, the UE may perform transmission using a Tx transmission method in which multiple antennas can be grouped and assumed as one antenna when the resources allocated for respective antennas (or layers) have the same value and may perform transmission using a predefined multi-antenna transmission mode when the resources allocated for respective antennas (or layers) have different values. The following is a more detailed description of the case where (ncs0, ncs1, ncs2, ncs3) are allocated. Although it is assumed in the present invention that a resource is allocated to each antenna (or layer), the present invention is not limited to the illustrated order of antennas.

4-Tx antenna transmission may be performed when ncs0≠ncs1≠ncs2≠ncs3.

Transmission may be performed using only ant1, ant2, and ant3 when ncs0=ncs1≠ncs2≠ncs3 or transmission of ant0 may be performed such that it appears that transmission is performed through 3-Tx antennas.

Transmission of only ant0 and ant2, transmission of only ant0 and ant3, transmission of only ant1 and ant2, and transmission of only ant1 and ant2 may be performed when ncs0=ncs1≠ncs2≠ncs3. Transmission of ant0 and ant1 may be performed such that it appears that single antenna transmission is performed and transmission of ant2 and ant3 may be performed such that it appears that single antenna transmission is performed, resulting in that it appears from the overall viewpoint that 2-Tx transmission is performed.

Figure 25:
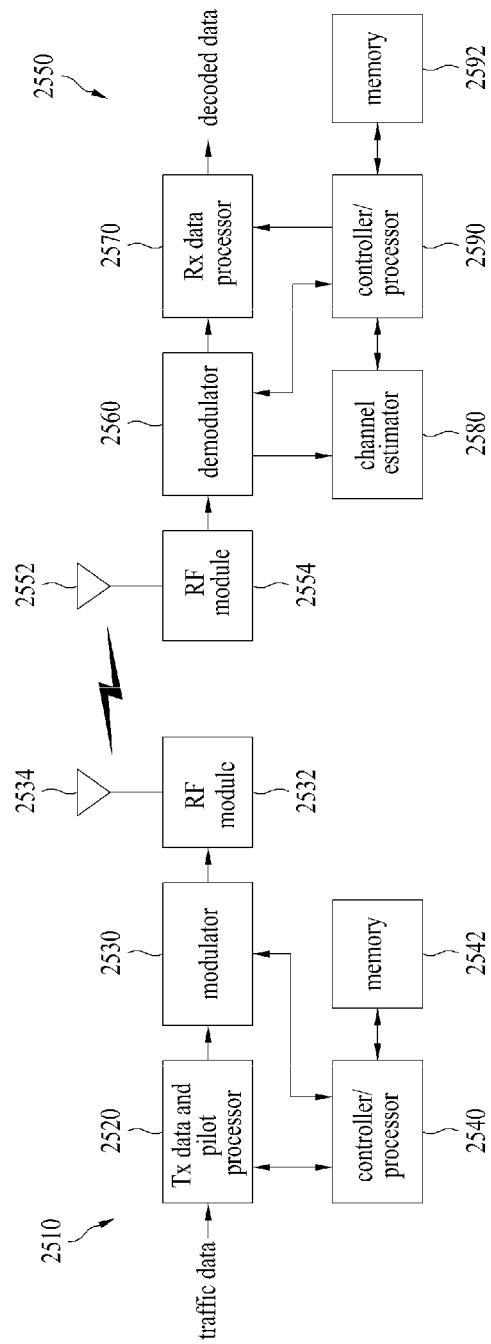
FIG. 25 is a block diagram of a transmitter/receiver according to an embodiment of the present invention.

FIG. 25 is a block diagram of a transmitter/receiver according to an embodiment of the present invention. In downlink, the transmitter 2510 is a portion of a base station and the receiver 2550 is a portion of a terminal. In uplink, the transmitter 2510 is a portion of a terminal and the receiver 2550 is a portion of a base station.

As shown in FIG. 25, in the transmitter 2510, a transmission (Tx) data and pilot processor 2520 encodes, interleaves and symbol-maps data (e.g., traffic data and signaling) and generates data symbols. In addition, the processor 2520 generates pilot symbols and multiplexes data symbols and pilot symbols. A modulator 2530 generates appropriate transport symbols according to a wireless access scheme. A Radio Frequency (RF) module 2532 processes (e.g., analog converts, amplifies, filters and frequency up-converts) the transport symbols and generates an RF signal transmitted through an antenna 2534. In the receiver 2550, an antenna 2552 receives a signal transmitted from the transmitter 2510 and supplies the signal to an RF module 2554. The RF module 2554 processes (e.g., filters, amplifies, frequency down-converts, and digitizes) the received signal and supplies input samples. A demodulator 2560 demodulates the input samples and supplies data values and pilot values. A channel estimator 2580 acquires a channel estimation value based on the received pilot values. In addition, the demodulator 2560 performs data detection (or equalization) with respect to the received data values using the channel estimation value and supplies data symbol estimation values for the transmitter 2510. A reception (Rx) data processor 2570 symbol-demaps, deinterleaves, and decodes the data symbol estimation values and supplies decoded data. In general, the processes of the demodulator 2560 and the Rx data processor 2570 in the receiver 2550 is complementary to the processes of the modulator 2530 and the Tx data and pilot processor 2520 in the transmitter 2510.

Controllers/processors 2540 and 2590 control the operations of various processing modules of the transmitter 2510 and the receiver 2550. Specifically, the controllers/processors 2540 and 2590 perform a digital signal processing procedure and control various processing modules in order to perform operations associated with the embodiments of the present invention that have been described with reference to the drawings. Memories 2542 and 2592 store program codes and data for the transmitter 2510 and the receiver 2550.

Various embodiments have been described in the best mode for carrying out the invention.

The above embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The embodiments of the present invention can be implemented by hardware, firmware, software, or any combination thereof. In the case where the present invention is implemented by hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

Those skilled in the art will appreciate that the present invention may be embodied in other specific forms than those set forth herein without departing from the spirit of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

INDUSTRIAL APPLICABILITY

The present invention is applicable to a radio communication system. Specifically, the present invention is applicable to a radio communication system that supports at least one of Single Carrier-Frequency Division Multiple Access (SC-FDMA), Multi Carrier-Frequency Division Multiple Access (MC-FDMA) and Orthogonal Frequency Division Multiple Access (OFDMA). More specifically, the present invention is applicable to a method and apparatus for transmitting a signal from a UE through multiple antennas in a radio communication system.

The invention claimed is:

1. A method of transmitting one or more demodulation reference signals (DMRSs) for a Physical Uplink Shared Channel (PUSCH) at a User Equipment (UE) configured with a transmission mode for multiple transmit antennas in a radio communication system, the method comprising:

receiving Downlink Control Information (DCI) for scheduling of the PUSCH, wherein the DCI includes a 3-bit value related to Cyclic Shift (CS) for DMRS;

determining N CS parameters based on the 3-bit value and a number of layers, wherein N is equal to the number of layers;

determining N CS values $\alpha_\lambda$ based on the N CS parameters by using the equation $\alpha_\lambda = 2\pi \cdot n_{CS,\lambda}/12$, wherein $n_{CS,\lambda}$ is a $\lambda^{th}$ CS parameter of the N CS parameters, $\lambda$ is and integer in a range from 0 to N−1; and generating N DMRS sequences based on the N CS values $\alpha_\lambda$ by using the expression $e^{j\alpha_\lambda \cdot n} \cdot \bar{r}_{u,v}(n)$, wherein $\bar{r}_{u,v}(n)$ is the base sequence, u is a group number, v is a base sequence number within a corresponding group, n is an integer in a range from 0 to $N_{sc}^{RS}-1$, and $N_{sc}^{RS}$ is a number of allocated subcarriers.

2. The method of claim 1, wherein
$\alpha_\lambda$ is determined using the equation:

$$\alpha_\lambda = 2\pi \cdot n_{CS,\lambda}/12$$

where $n_{CS,\lambda}$ is a $\lambda^{th}$ CS parameter of the N CS parameters, and $\lambda$ is an integer in a range from 0 to N−1.

3. The method of claim 1, wherein a plurality of CS parameters is predefined based on the 3-bit value and the N CS parameters are identified from the plurality of CS parameters by using the number of layers.

4. The method of claim 1, wherein the N DMRS sequences are used for demodulation of corresponding N layers of the PUSCH.

5. The method of claim 1, further comprising transmitting the N DMRS sequences for the PUSCH.

6. A method of receiving one or more demodulation reference signals (DMRSs) for a Physical Uplink Shared Channel (PUSCH) from a User Equipment (UE) configured with a transmission mode for multiple transmit antennas at a Base Station (BS) in a radio communication system, the method comprising:

transmitting, to the UE, Downlink Control Information (DCI) for scheduling of the PUSCH, wherein the DCI includes a 3-bit value related to Cyclic Shift (CS) for DMRS; and receiving, from the UE, N DMRS sequences for the PUSCH, wherein the N DMRS sequences are defined based on N CS values $\alpha_\lambda$ by using the expression $e^{j\cdot\alpha\lambda\cdot n}\cdot\bar{r}_{u,v}(n)$, wherein $\bar{r}_{u,v}(n)$ is the base sequence, u is a group number, v is a base sequence number within a corresponding group, n is an integer in a range from 0 to $N_{sc}^{RS}-1$, and $N_{sc}^{RS}$ is a number of allocated subcarriers, wherein the N CS values $\alpha_\lambda$ are determined based on N CS parameters by using the equation $\alpha_\lambda = 2\pi \cdot n_{CS,\lambda}/12$, wherein $n_{CS,\lambda}$ is a $\lambda^{th}$ CS parameter of the N CS parameters, $\lambda$ is an integer in a range form 0 to N−1, and wherein the N CS parameters are determined based on the 3-bit value and a number of layers, and N is equal to the number of layers.

7. The method of claim 6, wherein
$\alpha_\lambda$ is determined using the equation:

$$\alpha_\lambda = 2\pi \cdot n_{CS,\lambda}/12,$$

where $n_{CS,\lambda}$ is a $\lambda^{th}$ CS parameter on the N CS parameters, and $\lambda$ is an integer in a range from 0 to N−1.

8. The method of claim 6, wherein a plurality of CS parameters is predefined based on the 3-bit value and the N CS parameters are identified from the plurality of CS parameters by using the number of layers.

9. The method of claim 6, further comprising demodulating the PUSCH using the N DMRS sequences.

10. The method of claim 9, wherein the N DMRS sequences are used for demodulation of corresponding N layers of the PUSCH.

11. A User Equipment (UE) for transmitting one or more demodulation reference signals (DMRSs) for a Physical Uplink Shared Channel (PUSCH) in a radio communication system, the UE being configured with a transmission mode for multiple transmit antennas and comprising:

a Radio Frequency (RF) unit; and
a processor configured to:
receive Downlink Control Information (DCI) for scheduling of the PUSCH, wherein the DCI includes a 3-bit value related to Cyclic Shift (CS) for DMRS;

determine N CS parameters based on the 3-bit value and a number of layers, wherein N is equal to the number of layers;

determine N CS values $\alpha_\lambda$ based on the N CS parameters by using the equation $\alpha_\lambda = 2\pi \cdot n_{CS,\lambda}/12$, , wherein $n_{CS,\lambda}$ is a $\lambda^{th}$ CS parameter of the N CS parameters, $\lambda$ is an integer in a range from 0 to N—1; and generate N DMRS sequences based on the N CS values $\alpha_\lambda$ by using the expression $e^{j\cdot\alpha\lambda\cdot n}\cdot\bar{r}_{u,v}(n)$, wherein $\bar{r}_{u,v}(n)$ is the base sequence, u is a group number, v is a base sequence number within a corresponding group, n is an integer in a range from 0 to $N_{sc}^{RS}-1$, and $N_{sc}^{RS}$ is a number of allocated subcarriers.

12. The UE of claim 11, wherein
$\alpha_\lambda$ is determined using the equation:

$$\alpha_\lambda = 2\pi \cdot n_{CS,\lambda}/12,$$

where $n_{CS,\lambda}$ is a $\lambda^{th}$ CS parameter of the N CS parameters, and $\lambda$ is an integer in a range form 0 to N−1.

13. The UE of claim 11, wherein a plurality of CS parameters is predefined based on the 3-bit value and the N CS parameters are identified from the plurality of CS parameters by using the number of layers.

14. The UE of claim 11, wherein the N DMRS sequences are used for demodulation of corresponding N layers of the PUSCH.

15. The UE of claim 11, wherein the processor is further configured to transmit the N DMRS sequences for the PUSCH.

16. A Base Station (BS) for receiving one or more demodulation reference signals (DMRSs) for a Physical Uplink Shared Channel (PUSCH) from a User Equipment (UE) configured with a transmission mode for multiple transmit antennas in a radio communication system, the BS comprising:

a Radio Frequency (RF) unit; and
a processor configured to:
transmit, to the UE, Downlink Control Information (DCI) for scheduling of the PUSCH, wherein the DCI includes a 3-bit value related to Cyclic Shift (CS) for DMRS; and receive, from the UE, N DMRS sequences for the PUSCH, wherein the N DMRS sequences are defined based on N CS values $\alpha_\lambda$ by using the expression $e^{j\cdot\alpha\cdot\lambda\cdot n}\cdot\bar{r}_{u,v}(n)$, wherein $\bar{r}_{u,v}(n)$, is the base sequence, u is a group number, v is a base sequence number within a corresponding group, n is an integer in a range from 0 to $N_{sc}^{RS}-1$, and $N_{sc}^{RS}$ is a number of allocated subcarriers, wherein the N CS values $\alpha_\lambda$ are determined based on N CS parameters by using the equation $\alpha_\lambda = 2\pi \cdot n_{CS,\lambda}/12$, wherein $n_{CS,\lambda}$ is a $\lambda^{th}$ CS parameter of the N CS parameters, $\lambda$ is an integer in a range from 0 to N−1, and wherein the N parameters are determined based on the 3-bit value and a number of layers, and N is equal to the number of layers.

17. The method of claim 16, wherein
$\alpha_\lambda$ is determined using the equation:

$$\alpha_\lambda = 2\pi \cdot n_{CS,\lambda}/12,$$

where $n_{CS,\lambda}$ is a $\lambda^{th}$ CS parameter of the N CS parameters, and $\lambda$ is an integer in a range from 0 to N−1.

18. The BS of claim 16, wherein a plurality of CS parameters is predefined based on the 3-bit value and the N CS parameters are identified from the plurality of CS parameters by using the number of layers.

19. The BS of claim 16, wherein the processor is further configured to demodulate the PUSCH using the N DMRS sequences.

20. The BS of claim 19, wherein the N DMRS sequences are used for demodulation of corresponding N layers of the PUSCH.

\* \* \* \* \*